US011645779B1

(12) United States Patent
Pertsel

(10) Patent No.: US 11,645,779 B1
(45) Date of Patent: May 9, 2023

(54) USING VEHICLE CAMERAS FOR AUTOMATICALLY DETERMINING APPROACH ANGLES ONTO DRIVEWAYS

(71) Applicant: Ambarella International LP, Santa Clara, CA (US)

(72) Inventor: Anthony Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 253 days.

(21) Appl. No.: 17/026,346

(22) Filed: Sep. 21, 2020

(51) Int. Cl.
| G06T 3/00 | (2006.01) |
| G06T 7/73 | (2017.01) |
| G05D 1/00 | (2006.01) |
| G05D 1/02 | (2020.01) |
| G06N 3/04 | (2023.01) |
| G06N 3/08 | (2023.01) |
| G06V 20/56 | (2022.01) |
| H04Q 9/00 | (2006.01) |

(52) U.S. Cl.
CPC ............ G06T 7/74 (2017.01); G05D 1/0088 (2013.01); G05D 1/0221 (2013.01); G05D 1/0253 (2013.01); G06N 3/0454 (2013.01); G06N 3/08 (2013.01); G06V 20/56 (2022.01); G05D 1/0291 (2013.01); G05D 2201/0213 (2013.01); G06T 2207/10016 (2013.01); G06T 2207/20081 (2013.01); G06T 2207/20084 (2013.01); G06T 2207/30252 (2013.01); H04Q 9/00 (2013.01)

(58) Field of Classification Search
CPC ............ G06T 7/74; G06T 2207/10016; G06T 2207/20081; G06T 2207/20084; G06T 2207/30252; G05D 1/0088; G05D 1/0221; G05D 1/0253; G05D 1/0291; G05D 2201/0213; G06N 3/0454; G06N 3/08; G06V 20/56; H04Q 9/00
See application file for complete search history.

(56) References Cited

U.S. PATENT DOCUMENTS

| 2019/0197778 A1* | 6/2019 | Sachdeva ............... G06T 15/30 |
| 2020/0231016 A1* | 7/2020 | Vente ................. B60G 17/0165 |
| 2022/0024485 A1* | 1/2022 | Theverapperuma ........................ G06K 9/6257 |

OTHER PUBLICATIONS

Ni et al, Road Profile Estimation Using a 3D Sensor and Intelligent Vehicle, Sensors (Basel, Switzerland), 20(13), 3676, pp. 1-17 (Year: 2018).*

* cited by examiner

*Primary Examiner* — Nancy Bitar
*Assistant Examiner* — Xiao Liu
(74) *Attorney, Agent, or Firm* — Christopher P. Maiorana, PC

(57) ABSTRACT

An apparatus includes an interface and a processor. The interface may be configured to receive pixel data of an area external to a vehicle. The processor may be configured to generate video frames from the pixel data, perform computer vision operations on the video frames to detect objects in the video frames and determine characteristics of the objects, analyze the characteristics of the objects to determine elevation characteristics of a driving surface with respect to the vehicle, perform a comparison of the elevation characteristics to clearance data of the vehicle and determine an approach angle for the vehicle in response to the comparison. The approach angle may be determined to prevent an impact between the vehicle and the driving surface. The approach angle may be presented to a vehicle system.

24 Claims, 13 Drawing Sheets

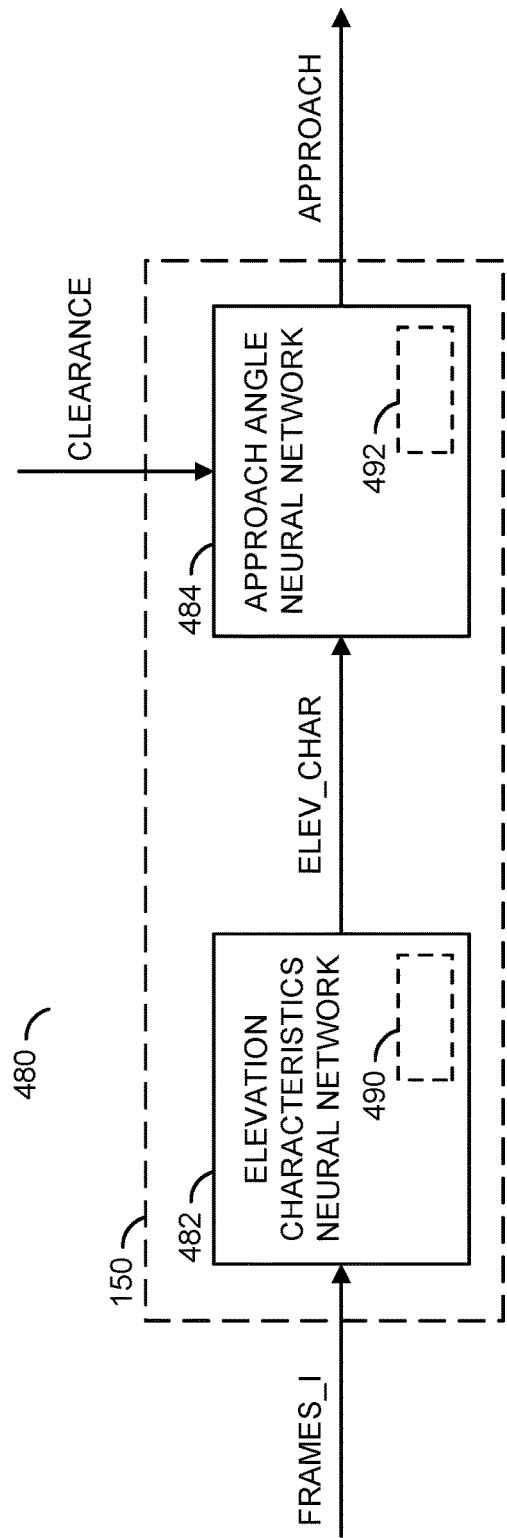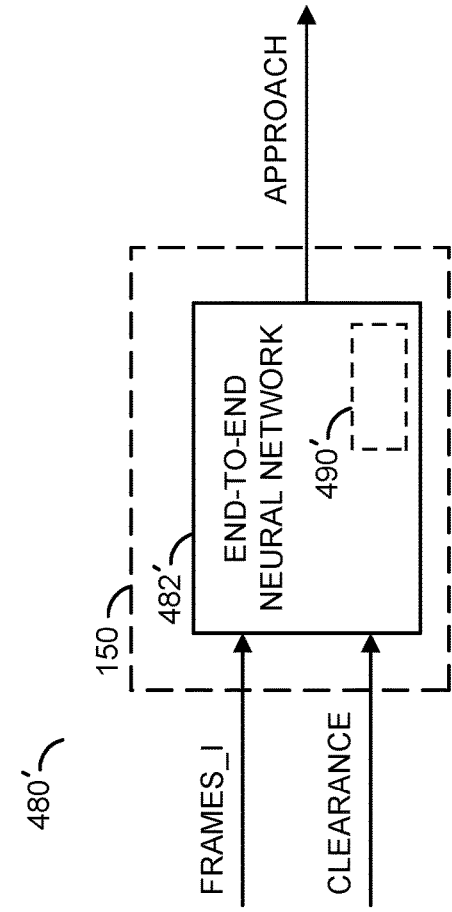

USING VEHICLE CAMERAS FOR AUTOMATICALLY DETERMINING APPROACH ANGLES ONTO DRIVEWAYS

FIELD OF THE INVENTION

The invention relates to computer vision generally and, more particularly, to a method and/or apparatus for implementing using vehicle cameras for automatically determining approach angles onto driveways.

BACKGROUND

Various driving assistance features are commonplace in many vehicles today. The various driving assistance features gather information through the use of vehicle-mounted cameras and sensors. As more camera information and sensor information becomes accessible, more features (both comfort and safety) can be provided. Decision-making can be performed by utilizing camera information and sensor information from hardware already installed in vehicles. There are still many driving problems that have not been addressed.

One of these unaddressed problems is frequently encountered by many drivers. When pulling into or out of a driveway, or driving onto or off of a surface elevated from the road, drivers cannot simply just always drive straight without risking scratching the bottom of their vehicle. For many consumer vehicles, depending on the degree of elevation and height of the vehicle off of the ground, the moving to or from a flat surface to an elevated surface can cause damage. To avoid damage, the driver must drive at an angle onto the elevated surface. However, human drivers have difficulty in judging the correct way to maneuver the vehicle in order to avoid damage. Lack of visibility, or lack of driving experience can result in damage. The elevated surface problem is encountered both when driving onto an elevated surface from the (flat) road and when driving from an elevated surface onto the (flat) road.

It would be desirable to implement using vehicle cameras for automatically determining approach angles onto driveways.

SUMMARY

The invention concerns an apparatus comprising an interface and a processor. The interface may be configured to receive pixel data of an area external to a vehicle. The processor may be configured to generate video frames from the pixel data, perform computer vision operations on the video frames to detect objects in the video frames and determine characteristics of the objects, analyze the characteristics of the objects to determine elevation characteristics of a driving surface with respect to the vehicle, perform a comparison of the elevation characteristics to clearance data of the vehicle and determine an approach angle for the vehicle in response to the comparison. The approach angle may be determined to prevent an impact between the vehicle and the driving surface. The approach angle may be presented to a vehicle system.

BRIEF DESCRIPTION OF THE FIGURES

Embodiments of the invention will be apparent from the following detailed description and the appended claims and drawings.

FIG. 8 is a block diagram illustrating a two neural network implementation.

FIG. 9 is a block diagram illustrating an end-to-end neural network implementation.

DETAILED DESCRIPTION OF THE EMBODIMENTS

Figure 1:
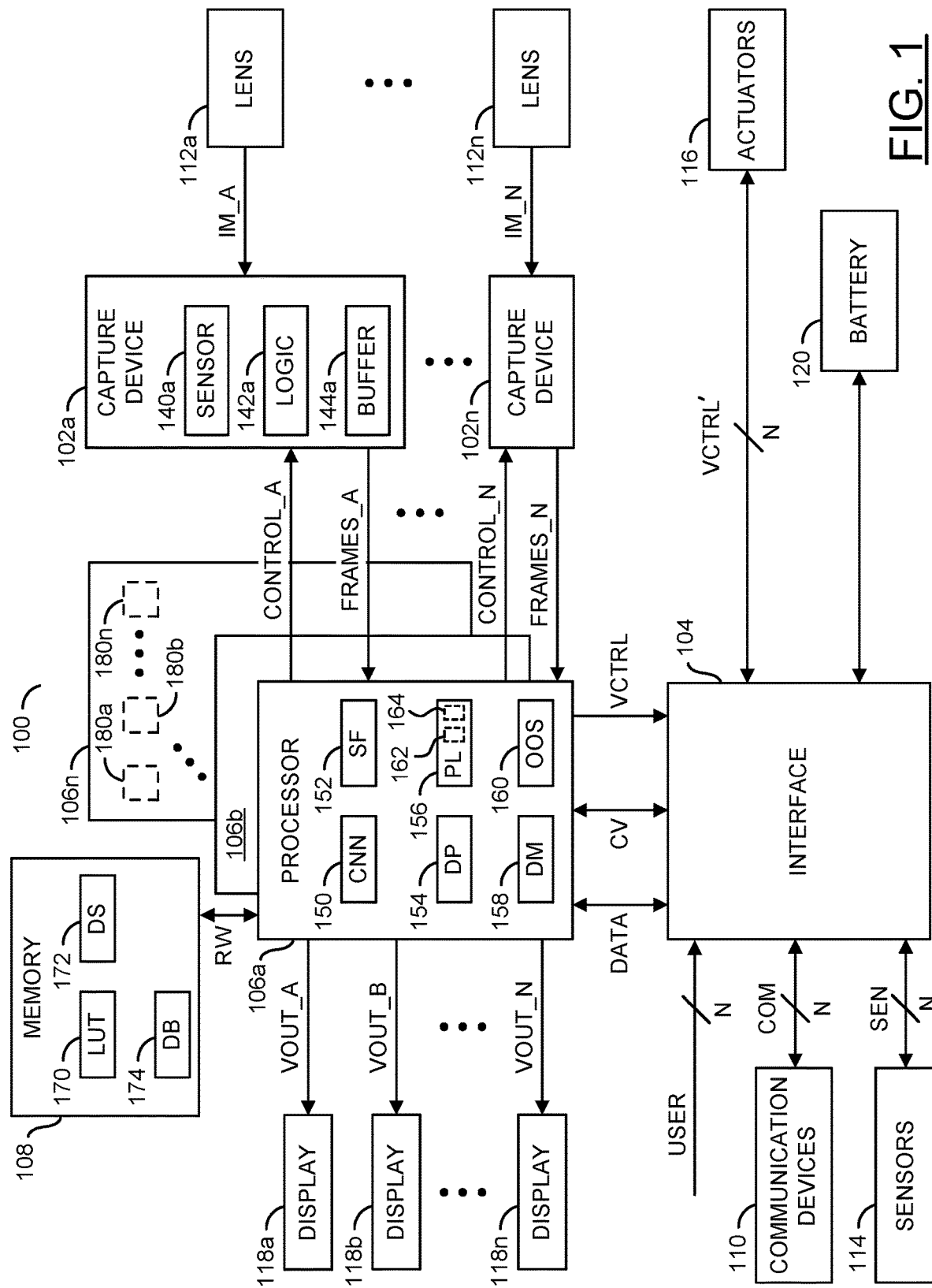
FIG. 1 is a diagram illustrating an embodiment of the present invention.

Embodiments of the present invention include providing using vehicle cameras for automatically determining approach angles onto driveways that may (i) detect an elevated surface, (ii) analyze video frames to determine a slope, height and/or width of an elevated surface, (iii) determine an approach angle for the elevated surface, (iv) provide a determined approach angle to an autonomous driving system, (v) provide a display overlay indicating the approach angle, (vi) provide training data for fleet learning, (vii) provide an approach angle for driving off of an elevated surface, (viii) provide an approach angle for driving onto an elevated surface, (ix) implement one or more neural networks to determine information about an elevated surface and an approach angle and/or (x) be implemented as one or more integrated circuits.

Embodiments of the present invention may be configured to use information generated from front-facing and/or rear-facing external cameras on vehicles to judge a slope, height, and width of an elevated surface. In an example, the elevated surface may be a driveway. A neural network may be implemented to determine a correct angle of approach for driving onto or off of the elevated surface. The neural network may be configured to use the data generated by cameras to determine an approach angle for the elevated surface.

In some embodiments of the present invention, information about the elevated surface (e.g., elevation characteristics such as a slope, a height, a width, other dimensions, etc.)

may be determined by one neural network. The neural network may implement an artificial intelligence model that may be configured to receive images (e.g., video frames) of the elevated surface as input. The neural network may be configured to generate the elevation characteristics as an output in response to the input images.

A separate neural network may implement an artificial intelligence model that may be configured to receive the elevation characteristics. The neural network may be configured to generate the approach angle for the elevated surface as an output in response to the elevation characteristics. The neural network responsible for the approach angle may receive as input the elevation characteristics such as the slope, height, and width of a driveway (e.g., from the output of the separate neural network responsible for determining the elevation characteristics) as well as clearance data about the vehicle attempting to traverse the elevated surface. The output may comprise information about an approach angle that would allow the vehicle to drive onto or off of the elevated surface and avoid (or prevent as much as possible) damage to the vehicle.

In some embodiments, a single neural network may be implemented (e.g., an end-to-end neural network). The end-to-end neural network may implement an artificial intelligence model that may be configured to receive the images of the elevated surface and the clearance data about the vehicle as input. The end-to-end neural network may be configured to generate the approach angle in response to the input images and clearance data.

The approach angle data generated may be provided to a vehicle system. In one example, the vehicle system may be an autonomous driving system configured to automatically drive a vehicle. The autonomous driving system (e.g., an autonomous vehicle control system) may be configured to read the approach angle data and the perform the task of driving onto (or off of) the driveway automatically using the approach angle determined by the neural network. If no approach angle for the elevated surface is possible without an issue (e.g., causing damage to the vehicle, causing an impact, the vehicle losing traction on the slope, etc.), then a warning may be generated before the autonomous driving system attempts to traverse the elevated surface. In another example, the vehicle system may be a display system visible by a driver of the ego vehicle. The approach angle data may be read by a video processor and/or a display unit to display to the driver a correct angle to take in order to avoid damaging the ego vehicle. For example, an overlay may be displayed on top of the video frames of the elevated surface. The overlay may comprise lines that represent where the wheels of the ego vehicle should go.

The neural network(s) implemented to determine the approach angle may be trained in various ways. Fleet learning may be implemented to acquire training data. The artificial intelligence models may be trained using training data labeled in response to a driver safely (e.g., without causing damage) driving onto or off of an elevated driveway. In one example, an accelerometer may be used to determine whether there has been an impact of the bottom of the vehicle with the elevated surface. In another example, a traction control sensor may measure whether the vehicle has slipped (e.g., lost traction) while traversing the elevated surface. In yet another example, manual feedback may be used to receive labeled training data.

Training data for determining the elevation characteristics may be obtained by measuring the driveway dimensions and/or analyzing the driveway surface using external cameras. Driver data may be obtained from test drivers or from fleet data, and may be continually (or continuously) used to improve the artificial intelligence model(s) of the neural network (s). Vehicles with connectivity may have the neural network(s) upgraded through over the air software upgrades. Similarly, the neural network(s) may be updated through service at a vehicle dealership.

In some embodiments, the elevation characteristics generated in response to analyzing images captured by cameras may be supplemented using other vehicle sensors (e.g., sensor fusion may be implemented). In one example, lidar may be used to acquire information used to determine the elevation characteristics. Lidar may comprise a significant increase in cost compared to implementing a camera system alone. In some embodiments, a database may be created configured to store which approach angles worked for which specific elevated surface (e.g., based on location information, such as GPS/GNSS).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-

106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown).

The number and/or type of signals communicated by the processor 106a-106n may be varied according to the design criteria of a particular implementation. The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102*a*-102*n* and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102*a*-102*n* may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus. The driving policy module 154 may be configured to enable human-like intuition.

The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102*a*-102*n*. In some embodiments, the video pipeline 156 may be configured to perform video stitching operations to stitch video frames captured by each of the lenses 112*a*-112*n* to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140*a*-140*n*) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118*a*-118*n* (e.g., the signals VOUT_A-VOUT_N).

The video pipeline module 156 may be configured to implement a raw image pipeline for image signal processing. The video pipeline module 156 may be configured to convert image data acquired from the capture devices 102*a*-102*n*. For example, the image data may be acquired from the image sensor 140*a* in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
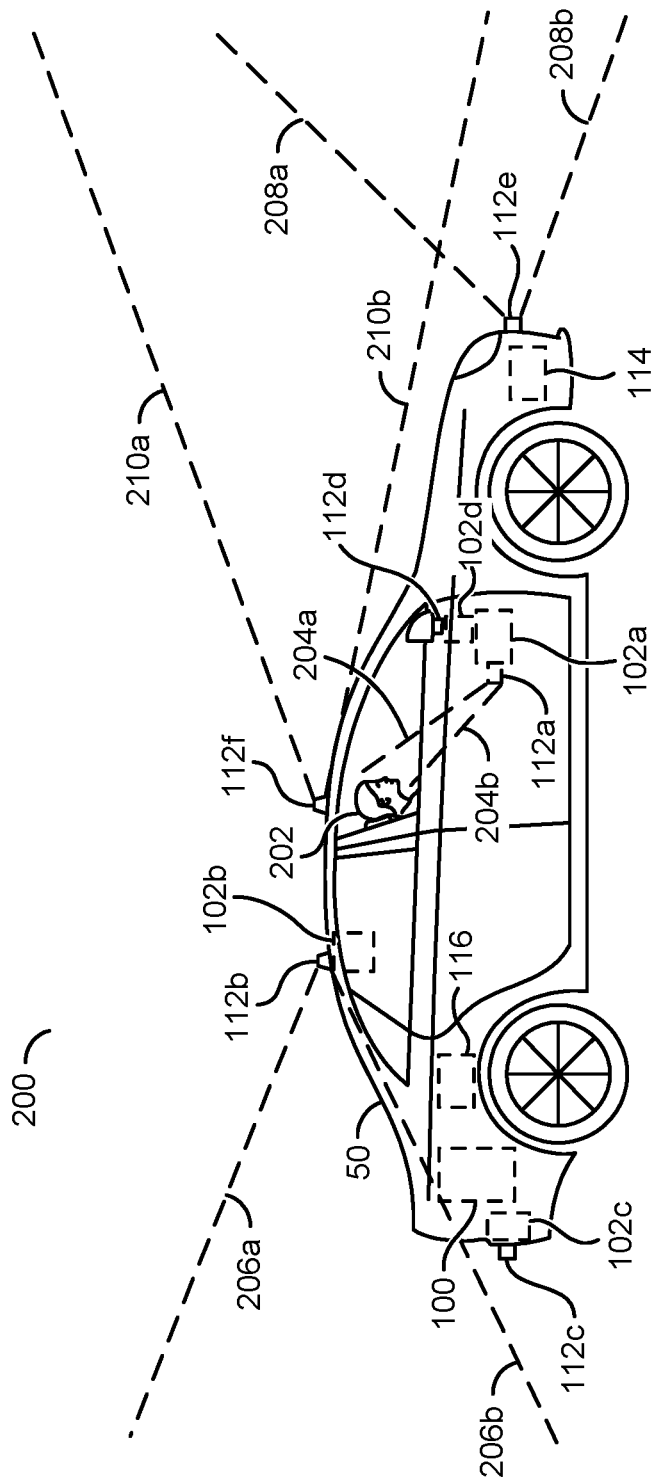
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112o) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
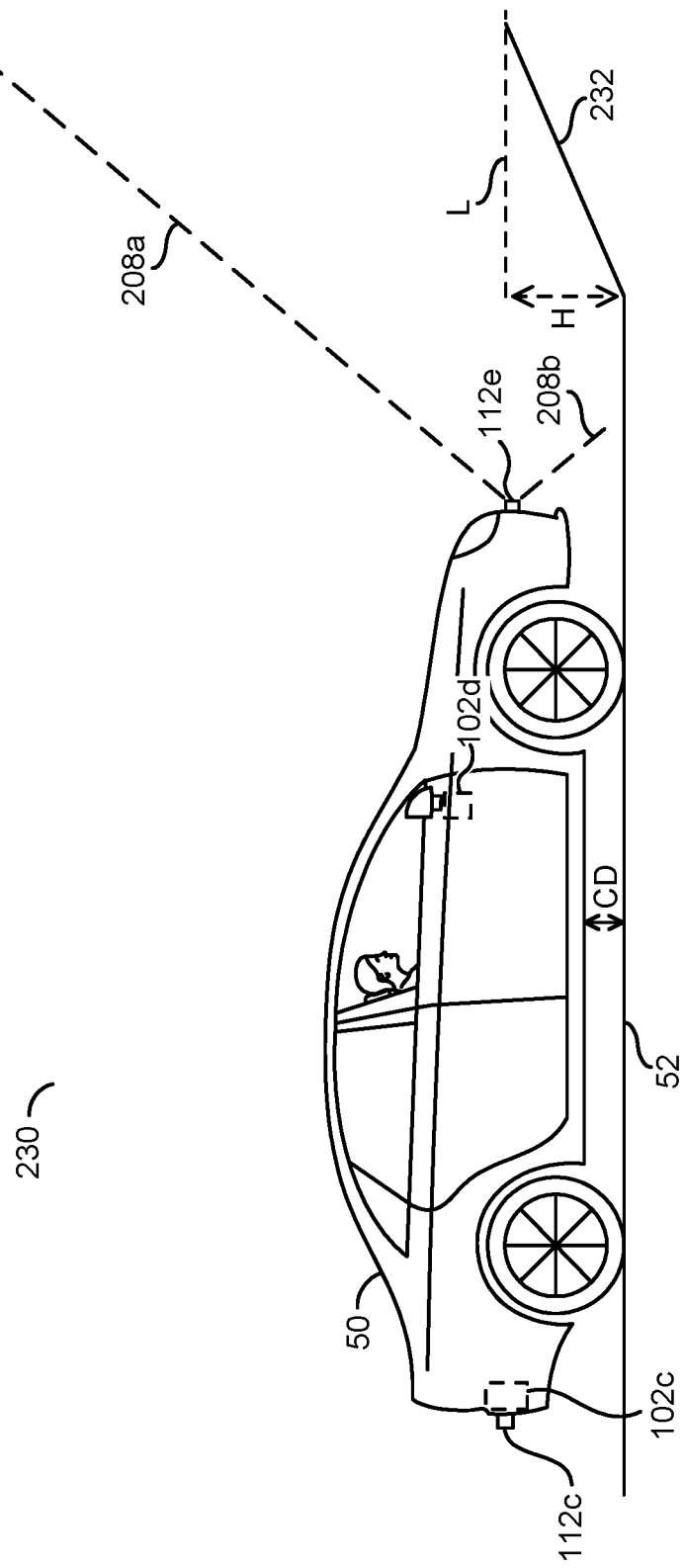
FIG. 3 is a diagram illustrating an ego vehicle approaching an elevated surface.

Referring to FIG. 3, a diagram illustrating an ego vehicle approaching an elevated surface is shown. A side view 230 of the ego vehicle 50 is shown. The ego vehicle 50 is shown driving on a surface 52. The surface 52 may be a road. The road 52 may be a generally flat (e.g., non-elevated) surface.

The ego vehicle 50 is shown having the rear lens 112c and the front lens 102d. The front field of view 208a-208b is shown. The capture device 102e may capture video data of the environment near the ego vehicle 50 within the field of view 208a-208b.

A distance (e.g., CD) is shown. The distance CD may represent a distance between a bottom of the body of the ego vehicle 50 and the road 52. The distance CD may represent a clearance distance. The clearance distance CD may be one example data source for clearance data of the ego vehicle 50. While one distance CD is shown, the clearance data of the ego vehicle 50 may comprise other measurements (e.g., measurements from multiple locations from the bottom of the ego vehicle 50, measurements of an overhang of the ego vehicle 50, measurements of a wheelbase, etc.). In an example, the clearance data CD may be stored by the memory 108 of the camera system 100.

The clearance data CD may be previously determined data about the ego vehicle 50. For example, the camera system 100 may be pre-programmed with the clearance data CD about the ego vehicle 50. In another example, the camera system 100 may be configured to communicate using an application programming interface of the ego vehicle 50 (e.g., using the interface 104) that may provide information about the ego vehicle 50, such as the clearance data CD, to the camera system 100. The method of providing information about the ego vehicle 50 to the camera system 100 may be varied according to the design criteria of a particular implementation.

A driving surface (e.g., an elevated surface) 232 is shown in front of the ego vehicle 50. For example, in the side view 230, the ego vehicle 50 may be traveling in a forward direction on the road 52. The road 52 may extend forward in front of the ego vehicle 50 and lead to the elevated surface 232. In one example, the elevated surface 232 may be an upward ramp. In another example, the elevated surface may be a driveway. In yet another example, the elevated surface may be a contour of the road surface (e.g., a transition for an elevation change). In still another example, the elevated surface may be a speed bump. While the elevated surface 232 is shown as in incline (e.g., towards an increased elevation), the elevated surface 232 may similarly be a decline (e.g., down towards a decreased elevation). The type of elevated surface 232 may be varied according to the driving scenario.

The elevated surface 232 is shown within the field of view 208a-208b. In the example shown, the ego vehicle 50 may be approaching the elevated surface 232 by traveling in a forward direction. Similarly, the camera lens 112c may capture the elevated surface 232 if the ego vehicle 50 is traveling in the reverse direction when the elevated surface 232 is behind the ego vehicle 50.

The camera system 100 may be configured to capture video frames of the elevated surface 232. The camera system 100 may be configured to perform computer vision to detect the elevated surface 232. The camera system 100 may be configured to analyze the detected object (e.g., the elevated surface 232) and/or determine characteristics of the elevated surface 232.

A height (e.g., H) of the elevated surface 232 is shown. A length (e.g., L) of the elevated surface is shown. The height H and the length L may be example elevation characteristics of the elevated surface 232. The analysis of the elevated surface 232 using the camera system 100 may be configured to determine the elevation characteristics. For example, by performing the computer vision operations on the video frames comprising the elevated surface 232, the camera system 100 may be able to determine the height H and/or the length L of the elevated surface.

The camera system 100 may be configured to determine a slope of the elevated surface 232. The slope may be an example of the elevation characteristic of the elevated surface 232. For example, the computer vision operations may detect the height H and/or the length L by measuring a number of pixels of the elevated surface, converting the number of pixels to a real-world measurement distance (e.g., based on a total number of pixels in the video frame and a ratio of the size of the pixels to a distance) and then convert the height H and the length L to a slope value.

The processors 106a-106n may be configured to compare the clearance distance CD of the ego vehicle 50 to the elevation characteristics. Based, on results of the comparison, the processors 106a-106n may determine an approach angle for the ego vehicle 50. The approach angle determined may enable the ego vehicle 50 to traverse the elevated surface 232 without causing damage to the ego vehicle 50 (e.g., prevent the ego vehicle 50 from scraping against the elevated surface 232 or 'bottoming out').

In some embodiments, the elevation characteristics of the elevated surface 232 may comprise characteristics of the surface that may be used to determine traction. In an example, the computer vision operations may be configured to detect whether the surface of the elevated surface 232 is dry, wet, muddy, snowy, etc. The detection of wet, muddy, snowy, and/or icy conditions may indicate that the traction may be compromised. For example, the processors 106a-106n may determine whether the ego vehicle 50 may be capable of traversing the elevated surface 232 without slipping. In some embodiments, the approach angle may be determined to help avoid loss of traction.

Figure 4:
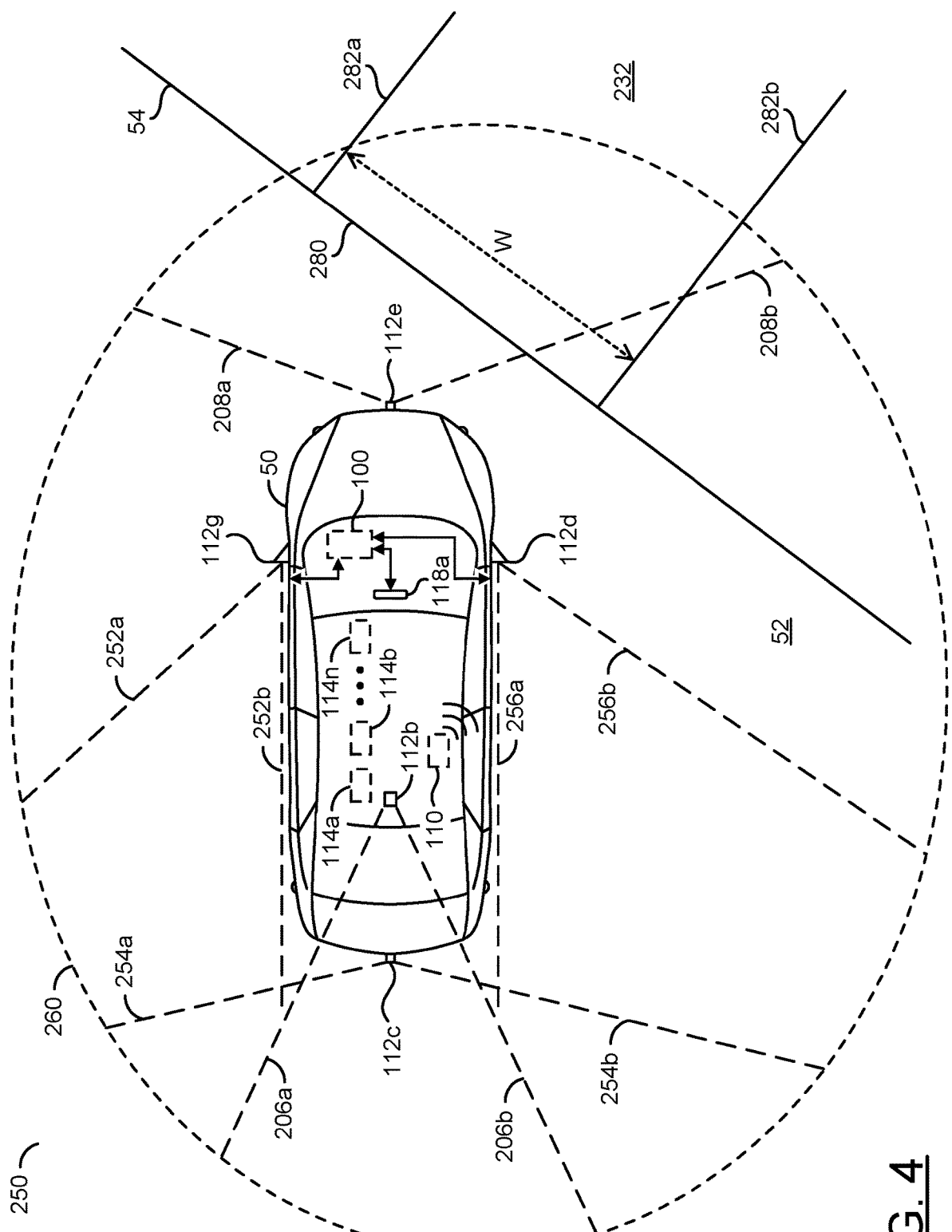
FIG. 4 is a diagram illustrating a 360 degree field of view for an ego vehicle captured by a camera system.

Referring to FIG. 4, a diagram illustrating a 360 degree field of view for an ego vehicle captured by a camera system is shown. An overhead view 250 of the ego vehicle 50 is shown. The apparatus 100 is shown within the ego vehicle 50. The communication device 110 is shown. The lenses 112a-112g are shown on the ego vehicle 50. The display 118a is shown within the ego vehicle 50. While only one of the displays 118a is shown as a representative example, generally the ego vehicle 50 may comprise more than one of the displays 118a-118n.

Each of the lenses 112a-112g may be directed to capture a different field of view. As shown in association with FIG. 2, the lens 112b may capture the field of view 206a-206b and the lens 112e may capture the field of view 208a-208b. Dotted lines 252a-252b are shown. The dotted lines 252a-252b may represent the field of view captured by the lens 112g (shown directed towards a rear of the ego vehicle 50 from the driver side mirror location). Dotted lines 254a-254b are shown. The lines 254a-254b may represent the field of view captured by the lens 112c (shown directed behind the ego vehicle 50 from the rear bumper location). Dotted lines 256a-256b are shown. The lines 256a-256b may represent the field of view captured by the lens 112d (shown directed towards a rear of the ego vehicle 50 from the passenger side mirror location). In an example, each of the fields of view captured by the lenses 112a-112g may be presented as video data to the displays 118a-118n and/or analyzed by the processors 106a-106n. The lenses 112a-112g and the corresponding fields of view (e.g., the fields of view 206a-206b, 208a-208b, 210a-210b, 252a-252b, 254a-254b and 256a-256b) are shown as an illustrative example. More lenses (e.g., the lenses 112a-112n) and/or fields of view may be captured by the apparatus 100.

A dotted circle 260 is shown. The dotted circle 260 may represent an exterior field of view from the perspective of the ego vehicle 50 captured by the apparatus 100. The processors 106a-106n may be configured to combine the video data captured by the capture devices 102a-102n to form the exterior field of view 260. The exterior field of view 260 may be a 360 degree field of view (e.g., a field of view that captures video data in all or most directions around the ego vehicle 50, a field of view that surrounds the ego vehicle 50, etc.). The lenses 112a-112g and the corresponding fields of view (e.g., the fields of view 206a-206b, 208a-208b, 210a-210b, 252a-252b, 254a-254b and 256a-256b) and/or data from other lenses (e.g., the lenses 112h-112n, not shown) may be combined to enable the processors 106a-106n to have access to video data over the full 360 degree field of view 260.

In some embodiments, the processors 106a-106n may be configured to perform video stitching operations and/or de-warping operations to form the 360 degree field of view 260. In some embodiments, the processors 106a-106n may be configured to analyze the video data captured by each of the capture devices 102a-102n and aggregate the results to make inferences about all the video data in the 360 degree field of view 260 (e.g., the video data from each field of view may be analyzed individually, and the results may be combined to effectively create the 360 degree field of view 260, even if a single video stream of all 360 degrees around the ego vehicle 50 is never actually created).

While a generally circular shape for the 360 degree field of view 260 is shown, the particular shape of the 360 degree field of view 260 may not be circular. For example, the range of each of the capture devices 102a-102n may be different. In another example, the physical location of the capture devices 102a-102n on the ego vehicle 50 may determine how far from the ego vehicle 50 the field of view 260 is able to reach. The 360 degree field of view may have an irregular shape. The circular shape of the 360 degree field of view 260 is shown for illustrative purposes. For example, the range of the 360 field of view 260 may extend farther from the ego vehicle 50 than shown. In some embodiments, the 360 degree field of view 260 may be spherical (e.g., capture the environment above the ego vehicle 50). In some embodiments, the field of view 260 may not be a full 360 degree field of view (e.g., locations below the ego vehicle 50 may not be captured).

The processors 106a-106n may be further configured to perform computer vision operations on the video data captured in the 360 degree field of view 260 (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

The sensor fusion module 152 may be configured to combine information about the objects detected from analyzing the video data captured with a detection of objects using the proximity sensors (e.g., one or more of the sensors 114 configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114, the distance limitations of the sensors 114, whether the computer vision detects the object at a distance beyond the range of the sensors 114, etc.). The ego vehicle 50 may implement the apparatus 100 that enables computer vision and 360 degree cameras to provide the exterior field of view 260 combined with additional information from the sensors 114 (e.g., such as ultrasonics, radars, gyroscope, accelerometer, etc.).

The processors 106*a*-106*n* may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to (e.g., avoid collisions, provide warnings, store information, avoid roadway hazards such as potholes, elevated surfaces, declined surfaces, etc.). For example, whether a detected scenario is considered an event may be determined by the decision module 158. In one example, the event may correspond to detecting that another vehicle, a pedestrian, a speed bump or another obstacle may be on a collision course with the ego vehicle 50. The events may be detected based on the computer vision operations performed on the video data captured using the lenses 112*a*-112*n*. The events may be detected based on readings from the sensors 114. For example, the sensor fusion module 152 may be configured to combine information determined using the computer vision operations and information detected using the sensors 114 to make inferences that may be used by the decision module 158.

The elevated surface 232 is shown. A line 54 is shown. The line 54 may represent a curb. A line 280 is shown. The line 280 is shown between lines 282*a*-282*b*. The line 280 may extend from the curb 54 between the lines 282*a*-282*b*. The line 280 may represent a transition from the road 52 to the elevated surface 232. The lines 282*a*-282*b* may represent a width of the elevated surface 232. The ego vehicle 50 is shown approaching the elevated surface 232 at an angle.

A distance (e.g., W) is shown. The distance W may represent a width of the elevated surface 232. The width W may extend between the lines 282*a*-282*b*. In the example shown, the elevated surface 232 may be a driveway. The line 280 may represent a break in the curb 54 that allows the ego vehicle 50 to drive onto the driveway 232. The line 280 and the width lines 282*a*-282*b* may represent the boundaries of the driveway 232.

The slope of the driveway 232 may be an upward slope or a downward slope. In one example, the driveway 232 may slope upwards. In another example, the driveway 232 may slope downwards (e.g., driving into an underground parking structure). Generally, the potential for damage to the ego vehicle 50 when traversing the elevated surface 232 may be at the transition 280. For example, if the elevated surface 232 is an upward slope, the ego vehicle 50 may impact the elevated surface 232 when driving from the road 52 (e.g., a flat surface) onto the transition 280 and up the elevated surface 232. In another example, if the elevated surface 232 is a downward slope, the ego vehicle 50 may impact the road 52 when driving down the elevated surface 232 (e.g., a declining surface) onto the transition 280 and onto the road 52. The example overhead view 250 may represent the example of driving onto an upward sloping surface (e.g., the ego vehicle 50 is on the road 52 and approaching the upward sloping elevated surface 232).

The processors 106*a*-106*n* may be configured to detect the elevated surface 232 using the computer vision operations. The processors 106*a*-106*n* may detect the transition 280 at the curb 54. The processors 106*a*-106*n* may detect the boundaries 282*a*-282*b* of the elevated surface 232. Using the computer vision operations, the processors 106*a*-106*n* may determine the width W of the elevated surface. The width W may be another example of the elevation characteristics. For example, the processors 106*a*-106*n* may be configured to measure the number of pixels between the boundary 282*a* and the other boundary 282*b*.

In the example shown, the curb 54, the elevated surface 232, the transition 280 and/or the boundaries 282*a*-282*b* are shown within the 360 degree field of view 260. For example, the lens 112*e* may capture the curb 54, the transition 280 and/or the boundaries 282*a*-282*b*. The processors 106*a*-106*n* may perform the computer vision operations to detect features that correspond to the elevated surface 232 (e.g., a slope, a difference in height between the curb 54 and the transition 280, a warning paint color such as yellow paint indicating a driveway, etc.). The types of features detected by the processors 106*a*-106*n* for determining the presence of the elevated surface 232 may be varied according to the design criteria of a particular implementation.

In the example shown, the ego vehicle 50 is approaching the transition 280 at an angle. The processors 106*a*-106*n* may be configured to determine a correct approach angle for the elevated surface 232 detected using the computer vision operations. The processors 106*a*-106*n* may be configured to compare the current angle of the ego vehicle 50 with respect to the elevated surface to the correct approach angle determined using the computer vision operations. In one example, the processors 106*a*-106*n* may generate the signal VCTRL to a vehicle system (e.g., the actuator 116 and/or the displays 118*a*-118*n*). In an example, the signal VCTRL may provide a control signal that enables a warning to the driver 202 to adjust the current approach angle of the ego vehicle 50 in order to avoid an impact with the elevated surface 232. In another example, the signal VCTRL may provide a control signal that enables a warning to the driver 202 that the elevated surface 232 may not be traversed without an impact.

One or more of the sensors 114 may implement an accelerometer and/or a gyroscope. The accelerator and/or the gyroscope may provide one source of data that indicates whether the ego vehicle 50 has received an impact. For example, if the bottom of the ego vehicle 50 contacts the elevated surface 232, the accelerometer and/or the gyroscope may measure the impact. In another example, if the ego vehicle 50 slips on the elevated surface 232, the accelerometer and/or the gyroscope may measure the amount of traction lost. A detection of an impact by the sensors 114 may provide feedback to the processors 106*a*-106*n* about whether the approach angle for the elevated surface 232 is correct. For example, if the sensors 114 detect an impact (or loss of traction), then the video frames for the elevated surface 232 may receive an incorrect label for training data. Similarly, if the sensors 114 do not detect an impact, then the video frames for the elevated surface 232 may receive a correct label for the training data.

One or more of the sensors 114 may be configured to detect the change in orientation of the ego vehicle 50. In an example, the sensors 114 may be configured as gyroscopes. The gyroscopes 114 may be used in combination with the computer vision operations (e.g., using the sensor fusion module 152) to determine when the ego vehicle 50 has driven over the transition 280 and onto the elevated surface 232 and then detect the pixel data that corresponds to the elevated surface 232. For example, the change in orientation of the ego vehicle 50 (e.g., a change in pitch by increasing an elevation of the front end of the ego vehicle 50 compared to the back end, or decreasing the front end of the ego vehicle 50 compared to the back end) may indicate that the ego vehicle 50 has driven onto or off of the elevated surface 232. The pixel data captured before the change in orientation may be used by the CNN module 150 as training data for detecting the elevated surface 232 using the computer vision operations.

The processors 106a-106n may be configured to generate annotated video frames (e.g., labeled video frames). The annotated video frames may comprise the pixel data that corresponds with the elevated surface 232. The apparatus 100 may be configured to use disparate sources of information (e.g., the computer vision operations and readings from the gyroscopes 114) to detect the change in orientation of the ego vehicle 50 and/or the pixel data that corresponds to the elevated surface 232. The change in orientation of the ego vehicle 50 may be one data source that indicates that the elevated surface 232 has been detected. The computer vision operations may be another data source that indicates that the elevated surface 232 has been detected. The combination of the data sources may be used to accurately identify the elevated surface 232 and/or measure the elevation characteristics of the elevated surface 232 in the video frames. The annotations provided in the video frames communicated to the central/distributed server using the signal COM may be used as training data. The training data may be used to train the artificial intelligence model used for detecting objects by the CNN module 150.

Figure 5:
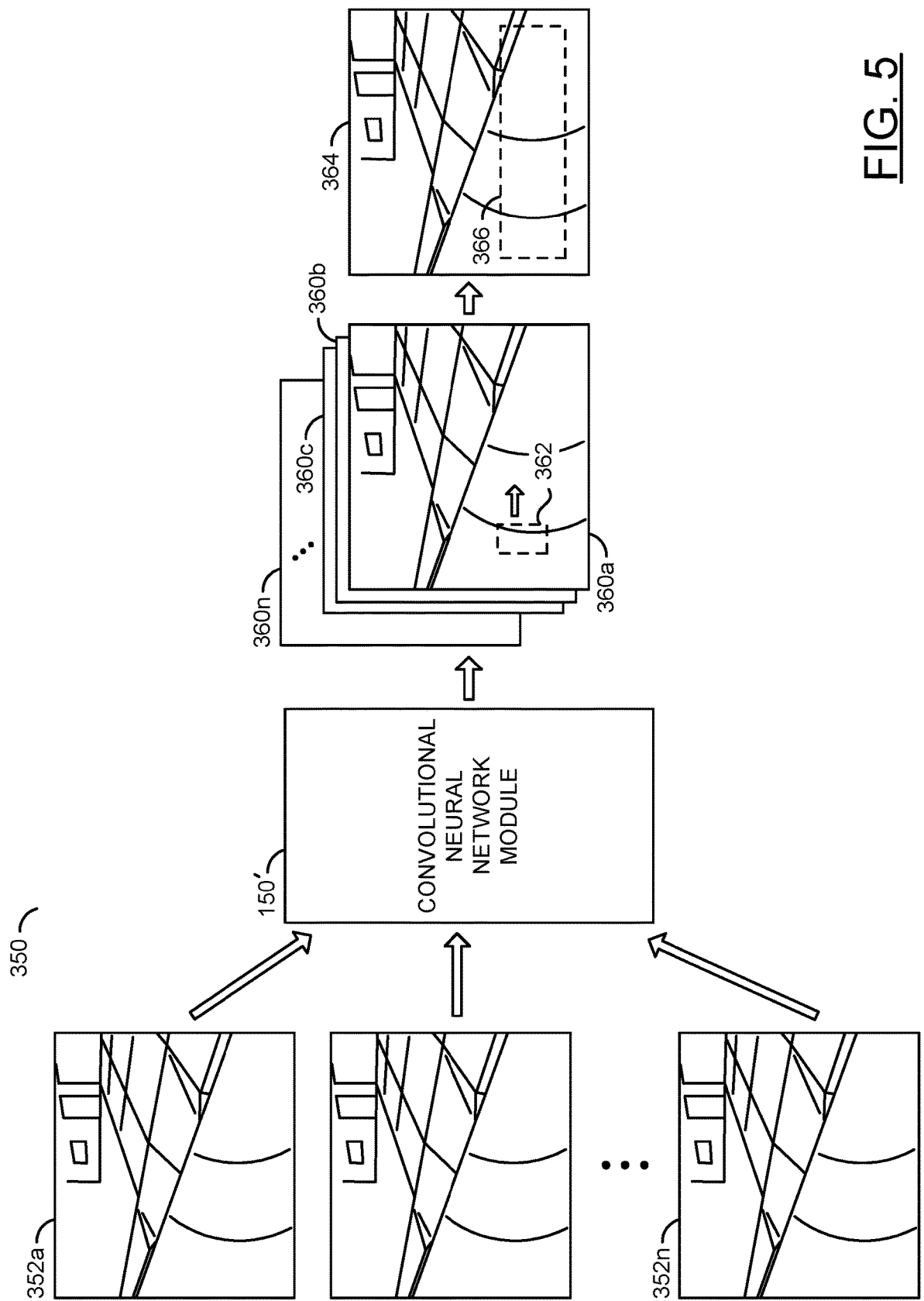
FIG. 5 is a diagram illustrating an example visualization of training a convolutional neural network for object detection using fleet learning.

Referring to FIG. 5, a diagram illustrating an example visualization of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of an elevated surface (e.g., captured from a front camera of the ego vehicle 50). For example, the training data 352a-352n may be a sequence of video frames captured prior to the processors 106a-106n determining that a change in orientation of the vehicle has occurred (e.g., caused by a speed bump, an inclined surface, a declined surface, etc.). The training data 352a-352n may be labeled based on whether the prediction was incorrect or correct. Using the training data 352a-352n (e.g., video frames captured from many different vehicles as the vehicles are produced, as different vehicles are deployed on the roads, etc.), many training data sets may be available to train the CNN module 150'. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features, vehicles, pedestrians, etc.) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may receive and analyze input images (e.g., the training data 352a-352n) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 364. The reference video frame 364 may comprise masks and/or categorized instances of the reference objects 366. The reference objects 3366 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100 in a fleet of vehicles. The CNN module 150' may continue to receive the training data 352a-352n from each apparatus 100, refine the machine learning model, and then provide updates to the machine learning model for each apparatus 100. The centralized CNN module 150' may develop, refine and/or enhance the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 6:
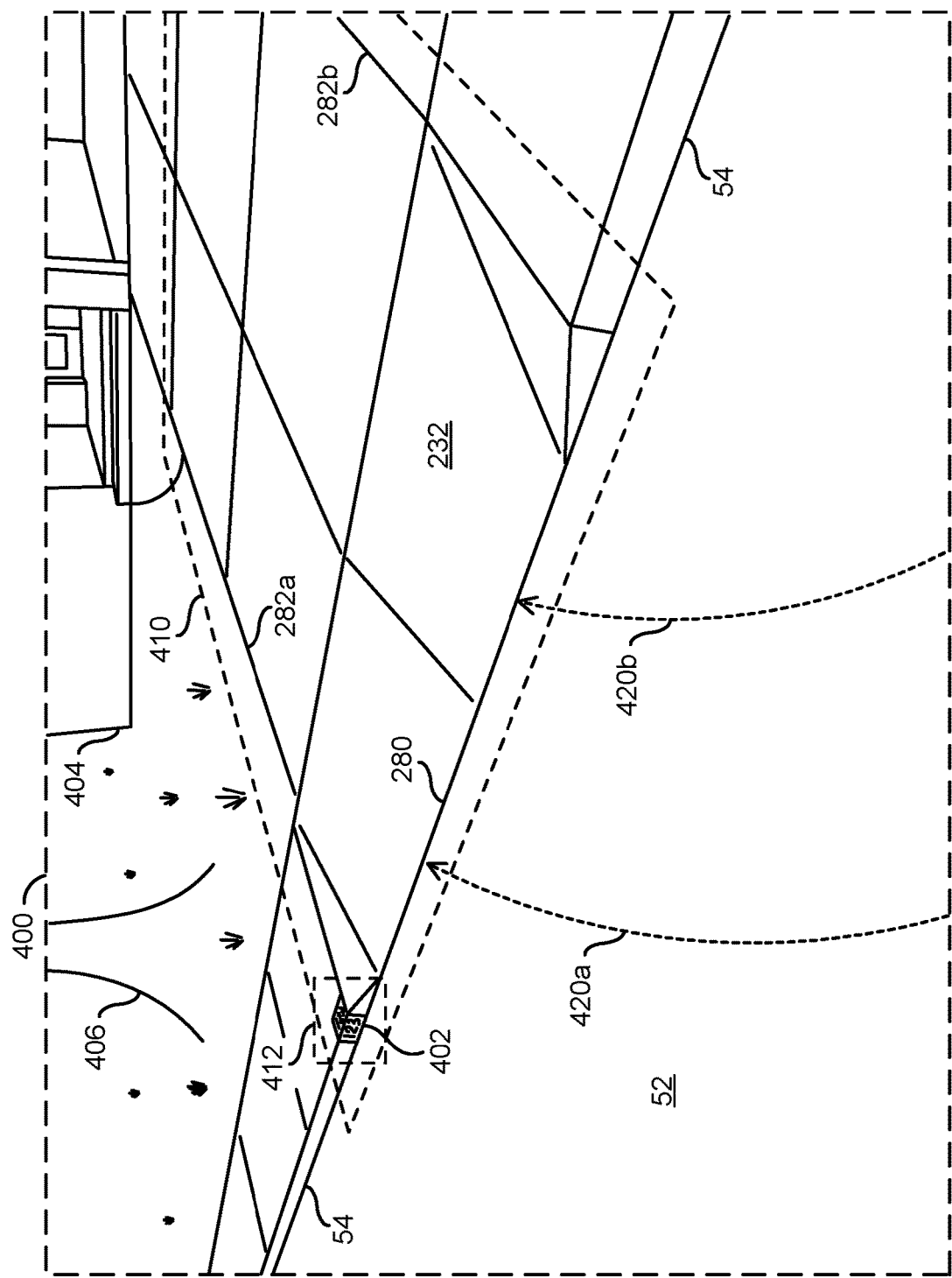
FIG. 6 is a diagram illustrating an object detection being performed on an example video frame in order to determine an approach angle for an elevated surface.

Referring to FIG. 6, a diagram illustrating an object detection being performed on an example video frame in order to determine an approach angle for an elevated surface is shown. An example video frame 400 is shown. The example video frame 400 may comprise pixel data captured by one or more of the capture devices 102a-102n. In one example, the video frame 400 may be provided to the processor 106a-106n as the signal FRAMES_A-FRAMES_N. In another example, the video frame 400 may be generated by the processors 106a-106n in response to the pixel data provided in the signal FRAMES_A-FRAMES_N. The pixel data may be received by the processors 106a-106n and video processing operations may be performed by the video processing pipeline 156 to generate the example video frame 400. In some embodiments, the example video frame 400 may be presented as human viewable video output to one or more of the displays 118a-118n. In some embodiments, the example video frame 400 may be utilized internal to the processor 106a-106n to perform the computer vision operations.

The example video frame 400 may comprise a view of the road 52, the curb 54, the elevated surface 232, the transition 280, the boundaries 282a-282b, an address 402, a house 404 and/or a tree 406. In the example video frame 400, the elevated surface 232 may be a driveway. The driveway 232 may provide a path to the house 404.

The example video frame 400 may represent a video frame captured by a front (or rear) mounted one of the capture devices 102a-102n. For example, the ego vehicle 50 may be driving on the road 52 and the driver 202 may be attempting to pull up the driveway 232. In one example, video frame 400 may be captured by the rear lens 112c of the ego vehicle 50 and the ego vehicle 50 may be driving in reverse up the driveway 232.

A dotted shape 410 and a dotted shape 412 are shown. The dotted shape 410 and the dotted shape 412 may represent the detection of objects by the computer vision operations performed by the processors 106a-106n. The dotted shape 410 and the dotted shape 412 may comprise the pixel data corresponding to an object detected by the computer vision operations pipeline 162 and/or the CNN module 150. The dotted shape 410 and the dotted shape 412 are shown for illustrative purposes. In an example, the dotted shape 410 and the dotted shape 412 may be a visual representation of the object detection (e.g., the dotted shapes 410-412 may not appear on an output video frame displayed on one of the displays 118a-118n). In another example, the dotted shapes 410-412 may be a bounding box generated by the processors 106a-106n displayed on the video frame to indicate that an object has been detected (e.g., the bounding boxes 410-412 may be displayed in a debug mode of operation). The number and/or types of objects detected by the processors 106a-106n may be varied according to the design criteria of a particular implementation.

The object 410 detected may be the elevated surface 232. The detected object 410 may comprise the transition 280 and/or the boundaries 282a-282b. The object 412 detected may be the address 402. For example, the processors 106a-106n may be configured to perform OCR operations to read text and associate the text of the address 402 to the house 404 and/or the elevated surface 232. In some embodiments, the processors 106a-106n may be configured store the elevation characteristics for a particular elevated surface according to a location. For example, GPS/GNSS data and/or address information may be stored along with elevation characteristics for a corresponding elevated surface for the location. Storing previously determined elevation characteristics may enable an approach angle to be provided without repeating calculations that have been previously performed.

The computer vision operations may be configured to detect characteristics of the detected objects. In the example video frame 400, elevation characteristics (e.g., height, length, width, slope, variation in slope, an arc length, etc.) may be detected by the processors 106a-106n. In another example, the detected characteristics may comprise a status of the elevated surface 232 (e.g., dry, icy, wet, muddy, snowy, etc.). For example, the computer vision operations may be configured to detect snow and determine that the characteristics of the elevated surface 232 may be a slippery surface. The types of characteristics detected may be varied according to the design criteria of a particular implementation.

Dotted arrows 420a-420b are shown. The dotted arrows 420a-420b may represent an approach angle for the elevated surface 232. The approach angle 420a-420b may be an illustrative representation of the approach angle. In one example, when the approach angle 420a-420b is presented to a vehicle system for displaying information on the displays 118a-118n, the approach angle 420a-420b may be visible on the output video frame (e.g., as a visual overlay). In another example, when the approach angle 420a-420b is presented to a vehicle system for performing autonomous control of the ego vehicle 50, the approach angle 420a-420b may not necessarily be visible on the output video frames.

The processors 106a-106n may be configured to determine the approach angle 420a-420b. The approach angle 420a-420b may be a unique solution for traveling from the road 52 onto the elevated surface 232 (or from the elevated surface 232 onto the road 52 for a declined elevated surface). Each elevated surface 232 detected may have a unique approach angle determined (e.g., even if the result ends up being the same for multiple different elevated surfaces). The processors 106a-106n may be configured to compare the clearance data of the ego vehicle 50 to the elevation characteristics extracted from the video frame 400 about the elevated surface 232. The processors 106a-106n may determine the approach angle 420a-420b for the elevated surface 232 in response to the comparison.

In the example shown, the approach angle 420a-420b may be generated for the ego vehicle 50 backing up onto the driveway 232 (e.g., driving into reverse). The processors 106a-106n may compare the relevant clearance data for the ego vehicle 50 to the elevation characteristics of the driveway 232. For example, the relevant clearance data may be a rear overhang of the ego vehicle 50 for traveling in reverse while the front overhang may not be relevant. Since the approach angle 420a-420b may be determined for the reverse driving scenario, a different approach angle may be determined if the ego vehicle 50 approaches the driveway 232 while driving forward (e.g., a front overhang of the ego vehicle 50 may be the relevant clearance data).

Figure 7:
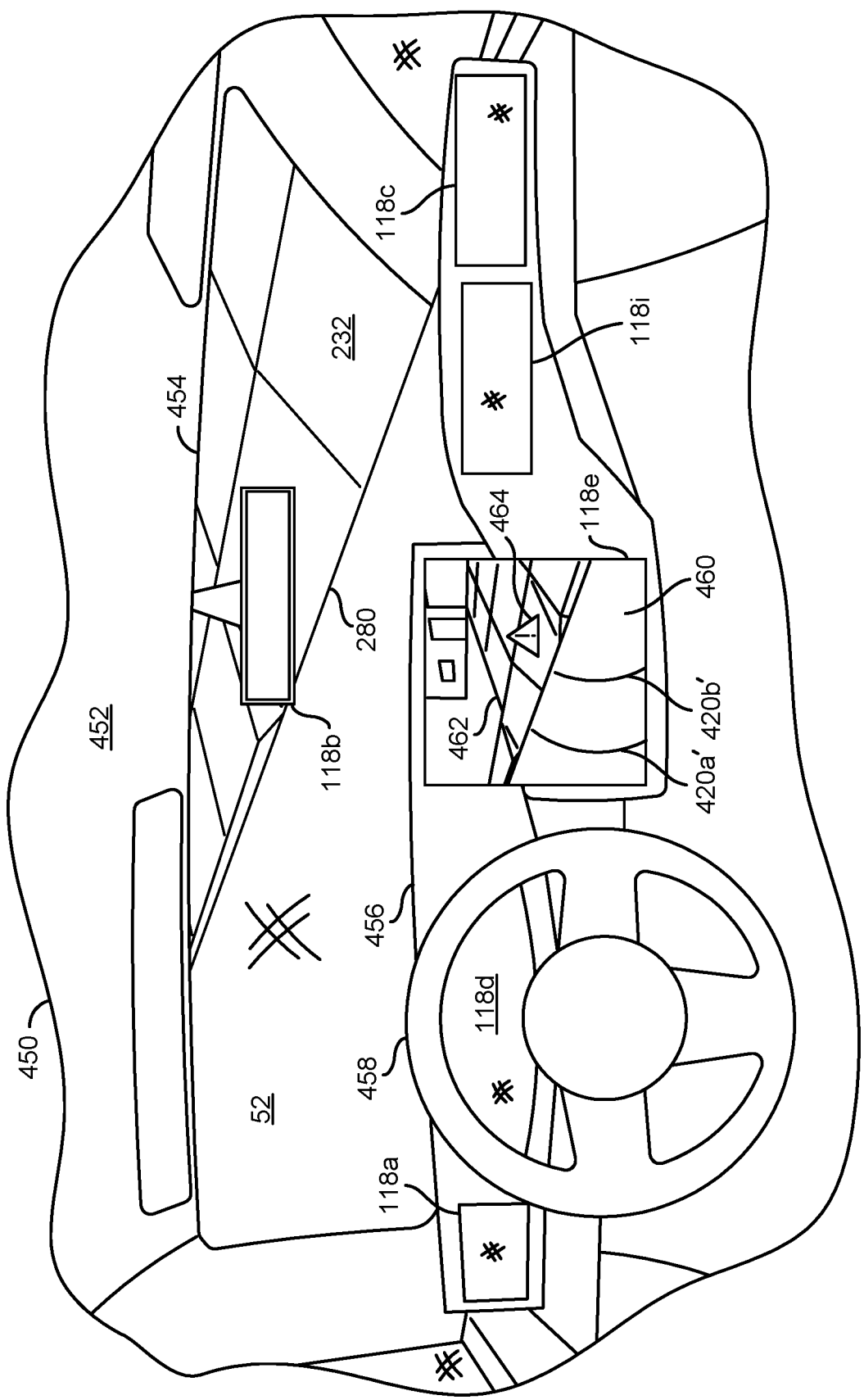
FIG. 7 is a diagram illustrating an ego vehicle display providing an approach angle guide in response to the computer vision operations.

Referring to FIG. 7, a diagram illustrating an ego vehicle display providing an approach angle guide in response to the computer vision operations is shown. A perspective 450 is shown. The perspective 450 may be a representation of a view of an interior 452 of the ego vehicle 50. The perspective 450 may generally provide a view of the interior 452 from the location and direction of the driver 202 but may not be what the driver 202 would actually see (e.g., may not be representative of a gaze direction).

The interior 452 of the ego vehicle 50 may comprise a windshield 454, a dashboard 456 and/or a steering wheel 458. A number of the displays 118a-118n are shown. In the example shown, the displays 118a-118i are shown throughout the interior 452. However, the number of the displays 118a-118n available in the ego vehicle 50 may be varied according to the design criteria of a particular implementation.

The road 52, the elevated surface 232 and the transition 280 are shown. The road 52, the elevated surface 232 and the transition 280 may be shown as part of the view through the windshield 454. For example, the ego vehicle 50 may be driving in a forward direction on the road 52. The ego vehicle 50 is shown angled towards the driveway 232 (e.g., turning while on the road 52 to drive up the driveway 232).

In the example shown, the display 118a may be located on the dashboard 456 to the left of the steering wheel 458. For example, the display 118a may be configured to display video data corresponding to the rear view from the driver side (e.g., emulating a driver side reflective mirror). In the example shown, the display 118b may be located at the top of the windshield 454. For example, the display 118b may be configured to display video data corresponding to the rear view (e.g., emulating a traditional reflective rearview mirror). In the example shown, the display 118c may be located on the dashboard 456 to the far right of the interior 452. For example, the display 118c may be configured to display video data corresponding to the rear view from the passenger side (e.g., emulating a passenger side reflective mirror).

The display 118d may be located on the dashboard 456 behind the steering wheel 458, and the displays 118e-118i may be located on the dashboard 456 at various locations to the right of the steering wheel 458. In one example, one or more of the displays 118d-118i may be configured to display vehicle information (e.g., warning icons, speed, distance, temperature, odometer, etc.). In another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

The display 118e is shown as a large screen generally centered on the dashboard 456. The display 118e is shown displaying a video output 460. The video output 460 may be an example of information comprising the video data captured by the captured devices 102a-102n and/or additional information generated by the processors 106a-106n that may be shown to the driver 202. The video output 460 may be similar to the example video frame 400 shown in association with FIG. 6. The video output 460 may provide a view of the exterior of the ego vehicle 50 similar to what may be seen through the windshield 454. For example, the video output 460 may be a lower angle view than the view through the windshield 454 (e.g., the video output 460 may be captured by the lens 112e mounted to the front bumper of the ego vehicle 50). A representation 462 of the elevated surface 232 is shown as part of the video output 460. An approach angle guide 420a'-420b' is shown as part of the video output 460. The approach angle guide 420a'-420b' may show a path to the driveway 462 that allows for the ego vehicle 50 to enter at the correct approach angle.

The approach angle guide 420a'-420b' may be generated by the processors 106a-106n as an overlay. The processors 106a-106n may generate the video VOUT_A-VOUT_N (e.g., comprising output video frames). The signals VOUT_A-VOUT_N may comprise video frames generated from the pixel data captured by the capture devices 102a-102n. The processors 106a-106n may add the approach angle guide 420a'-420b' as a post-processing effect to the video frames (e.g., by adding content to the video data that was not physically present in the real world that was captured by the capture devices 102a-102n).

The overlay graphic for the approach angle guide 420a'-420b' may be generated (and continually re-generated) in real-time. The overlay graphic for the approach angle guide 420a'-420b' may represent a visual instruction about where the driver 202 should steer the wheels of the ego vehicle 50 using the steering wheel 458 in order to achieve the approach angle 420a-420b determined by the processors 106a-106n.

The processors 106a-106n may be configured to determine the approach angle 420a-420b for the elevated surface 232 using the computer vision operations. Then the processors 106a-106n may determine a current orientation of the wheels of the ego vehicle 50. The processors 106a-106n may be configured to compare the current orientation of the wheels of the ego vehicle 50 to the approach angle 420a-420b determined. Based on the comparison, the processors 106a-106n may generate the graphical overlay for the approach angle guide 420a'-420b'. The graphical overlay for the approach angle guide 420a'-420b' may represent how the driver 202 may achieve the approach angle 420a-420b based on the current orientation of the wheels of the ego vehicle 50.

As the driver 202 moves the steering wheel 458 and/or moves the ego vehicle 50 with respect to the elevated surface 232, the processors 106a-106n may re-calculate a comparison between the position of the ego vehicle 50 with respect to the elevated surface 232, the current orientation of the wheels of the ego vehicle 50 and/or the approach angle 420a-420b. Based on the re-calculation, the graphical overlay for the approach angle guide 420a'-420b' may be re-drawn. If the ego vehicle 50 reaches a location with the orientation of the wheels too far out of alignment with the approach angle 420a-420b, the graphical overlay for the approach angle guide 420a'-420b' may be changed to a message (e.g., stop the car, back up and try again).

A graphic 464 is shown on the display 118e. The graphic 464 may provide a warning. In the example shown, the warning graphic 464 may be an exclamation point within a triangle. In the example shown, the warning graphic 464 may be located on the representation 462 of the driveway 232. The location and/or design of the warning graphic 464 may be varied according to the design criteria of a particular implementation.

The processors 106a-106n may be configured to analyze the elevated surface 232 to determine the approach angle 420a-420b. In some scenarios, the approach angle 420a-420b may provide an angle for traversing the elevated surface 232 without the ego vehicle impacting the elevated surface 232. In some scenarios, the elevated surface 232 may not be capable of being traversed without resulting in an impact with the ego vehicle 50 (e.g., the elevated surface 232 is too steep, the clearance distance CD of the ego vehicle 50 is too low, the ego vehicle 50 does not have enough traction, etc.). For example, when an impact is unavoidable, the processors 106a-106n may determine the 420a-420b that results in a lowest possible amount of damage compared to other possible approach angles.

In a scenario where the impact is unavoidable, the processors 106a-106n may generate a warning. The warning may be provided using the warning graphic 464. For example, on the display 118e, the warning graphic 464 may indicate to the driver 202 that the elevated surface 232 may not be traversed without an impact (or without losing traction). In one example, the processors 106a-106n may provide the approach angle 420a-420b along with the warning to the vehicle system that performs autonomous driving. In response to the warning, the vehicle system that performs autonomous driving may wait until further instructions are provided (e.g., wait until receiving an input from the occupant).

Referring to FIG. 8, a block diagram illustrating a two neural network implementation is shown. An example neural network implementation 480 is shown. The example neural network implementation 480 may be a two neural network implementation. The neural network implementation 480 may comprise a block diagram of the CNN module 150.

The CNN module 150 is shown comprising a block (or circuit) 482 and/or a block (or circuit) 484. The circuit 482 may implement an elevation characteristics neural network. The circuit 484 may implement an approach angle neural network. The elevation characteristics neural network 482 is shown comprising a block (or circuit) 490. The circuit 490 may implement an artificial intelligence model for elevation characteristics. The approach angle neural network 484 is shown comprising a block (or circuit) 492. The circuit 492 may implement an artificial intelligence model for approach angle. The CNN module 150 may comprise other components (not shown). The number, type and/or arrangement of the components of the CNN module 150 may be varied according to the design criteria of a particular implementation.

The elevation characteristics neural network 482, the approach angle neural network 484, the artificial intelligence model for elevation characteristics 490 and/or the artificial intelligence model for approach angle 492 may be conceptual components. In one example, one or more of the elevation characteristics neural network 482, the approach angle neural network 484, the artificial intelligence model for elevation characteristics 490 and/or the artificial intelligence model for approach angle 492 may be discrete components. In another example, one or more of the elevation characteristics neural network 482, the approach angle neural network 484, the artificial intelligence model for elevation characteristics 490 and/or the artificial intelligence model for approach angle 492 may be implemented using shared resources (e.g., one or more of the hardware modules 180a-180n).

The CNN module 150 is shown receiving the signal FRAMES_I. While only the signal FRAMES_I is shown, the CNN module 150 may receive any of the pixel data signals FRAMES_A-FRAMES_N. The CNN module 150 is shown receiving a signal (e.g., CLEARANCE). The signal CLEARANCE may comprise clearance information about the ego vehicle 50. For example, the signal CLEARANCE may be generated by the memory 108. The CNN module 150 is shown generating a signal (e.g., APPROACH). The signal APPROACH may be the approach angle 420a-420b determined. The signal APPROACH may be presented by the processors 106a-106n to one or more systems of the ego vehicle 50 (e.g., the displays 118a-118n, an autonomous driving system, an audio system for audio alerts, etc.). The number signals and/or type of data carried by each of the signals generated and/or received by the CNN module 150 may be varied according to the design criteria of a particular implementation.

The elevation characteristics neural network 482 may be configured to receive the pixel data (or video frames) FRAMES_I. The elevation characteristics neural network 482 may be configured to determine elevation characteristics in response to the pixel data FRAMES_I. For example, the elevation characteristics neural network 482 may be configured to perform the computer vision operations on the pixel data FRAMES_I and determine the elevation characteristics of any elevated surfaces shown in the pixel data. The elevation characteristics neural network 482 may be configured to generate a signal (e.g., ELEV_CHAR). The signal ELEV_CHAR may comprise the elevation characteristics.

The artificial intelligence model 490 may be trained in response to the training data generated when the CNN module 150 operates in the training mode of operation. In one example, the artificial intelligence model 490 may be a directed acyclic graph. The artificial intelligence model 490 may be developed (e.g., trained) in response to the training data 352a-352n as described in association with FIG. 5. The training data 352a-352n may comprise labeled images of elevated surfaces. The labels (e.g., metadata) for the training data 352a-352n may indicate which portions of the images are elevated surfaces and/or the elevation characteristics (e.g., slope, width, height, etc.) of the elevated surfaces. When the artificial intelligence model 490 is trained, the artificial intelligence model 490 may be configured to recognize (e.g., classify) the pixel data FRAMES_I as having the elevated surface 232 and/or determine the elevation characteristics of the elevated surface 232.

The approach angle neural network 484 may be configured to receive the elevation characteristics ELEV_CHAR and/or the clearance information CLEARANCE. The approach angle neural network 484 may be configured to determine the approach angle 420a-420b in response to the elevation characteristics ELEV_CHAR and the clearance information CLEARANCE. For example, the approach angle neural network 484 may generally not perform the computer vision operations. The approach angle neural network 484 may receive the elevation characteristics ELEV_CHAR that were previously determined using the computer vision operations. The approach angle neural network 484 may be configured to generate the signal APPROACH. The signal APPROACH may comprise the approach angle 420a-420b. The approach angle 420a-420b may be determined by evaluating how much space is needed to traverse the elevated surface 232 without causing an impact to the bottom of the ego vehicle 50 based on the amount of clearance under the ego vehicle 50. The approach angle neural network 484 may be further configured to determine whether the ego vehicle 50 has sufficient traction and/or horsepower to traverse the elevated surface 232.

The artificial intelligence model 492 may be trained in response to the training data generated when the CNN module 150 operates in the training mode of operation. In one example, the artificial intelligence model 492 may be a directed acyclic graph. The artificial intelligence model 492 may be developed (e.g., trained) in response to elevation characteristics and/or clearance data. The training data may comprise labeled combinations of approach angles, clearance information and elevation characteristics. The labels (e.g., metadata) for the training data may indicate whether there has been an impact with the elevated surfaces (or whether there was loss of traction). For example, the vehicle sensors 114 (e.g., an accelerometer, a gyroscope) may indicate whether an impact has occurred when the ego vehicle 50 travels up (or down) the elevated surface 232. The output of the sensors 114 may provide the label for the training data for the artificial intelligence model 492. Similarly, the label for the training data may be provided from user input (e.g., the driver 202 provides feedback about whether or not an impact occurred). When the artificial intelligence model 492 is trained, the artificial intelligence model 492 may be configured to determine the approach angle 420a-420b based on the elevation characteristics and the clearance data.

Referring to FIG. 9, a block diagram illustrating an end-to-end neural network implementation is shown. An example neural network implementation 480' is shown. The example neural network implementation 480' may be a single end-to-end neural network implementation. The neural network implementation 480' may comprise a block diagram of the CNN module 150.

The CNN module 150 is shown comprising a block (or circuit) 482'. The circuit 482' may implement an end-to-end neural network. The elevation characteristics network is shown comprising a block (or circuit) 490'. The circuit 490' may implement an artificial intelligence model for elevation characteristics and approach angle. The end-to-end neural network 482' and/or the artificial intelligence model 490' may be implemented using one or more of the hardware modules 180a-180n. The CNN module 150 is shown receiving the signal FRAMES_I and/or the signal CLEARANCE. While only the signal FRAMES_I is shown, the CNN module 150 may receive any of the pixel data signals FRAMES_A-FRAMES_N. The CNN module 150 is shown generating the signal APPROACH. The signal APPROACH may be presented by the processors 106a-106n to one or more systems of the ego vehicle 50 (e.g., the displays 118a-118n, an autonomous driving system, an audio system for audio alerts, etc.). The number and/or type of components implemented and/or data carried by each of the signals generated and/or received by the CNN module 150 may be varied according to the design criteria of a particular implementation.

The end-to-end neural network 482' may be configured to determine elevation characteristics in response to the pixel data FRAMES_I. For example, the end-to-end neural network 482' may be configured to perform the computer vision operations on the pixel data FRAMES_I and determine the elevation characteristics of any elevated surfaces shown in the pixel data. Using the elevation characteristics determined using the computer vision operations and the clearance data CLEARANCE, the end-to-end neural network 482' may be configured to determine the approach angle

420a-420b. The signal APPROACH may be generated in response to the elevation characteristics (e.g., determined in response to the signal FRAMES_I) and the clearance data.

The artificial intelligence model 490' may be trained in response to the training data generated when the CNN module 150 operates in the training mode of operation. In one example, the artificial intelligence model 490' may be a directed acyclic graph. The artificial intelligence model 490' may be developed (e.g., trained) in response to the training data 352a-352n as described in association with FIG. 5. The training data 352a-352n may comprise labeled images of elevated surfaces. The labels (e.g., metadata) for the training data 352a-352n may indicate which portions of the images are elevated surfaces and/or the elevation characteristics (e.g., slope, width, height, etc.) of the elevated surfaces. The training data 352a-352n may further comprise a label based on the clearance information and/or whether there was an impact (or loss of traction). The labels (e.g., metadata) for the training data 352a-352n may indicate whether there has been an impact with the elevated surfaces. For example, to implement the end-to-end neural network 482', the type of training data gathered may comprise the video frames, the clearance information and whether there has been an impact. When the artificial intelligence model 490' is trained, the artificial intelligence model 490' may be configured to recognize (e.g., classify) the pixel data FRAMES_I as having the elevated surface 232, determine the elevation characteristics of the elevated surface 232, and/or determine the approach angle 420a-420b for the elevated surface 232.

Figure 10:
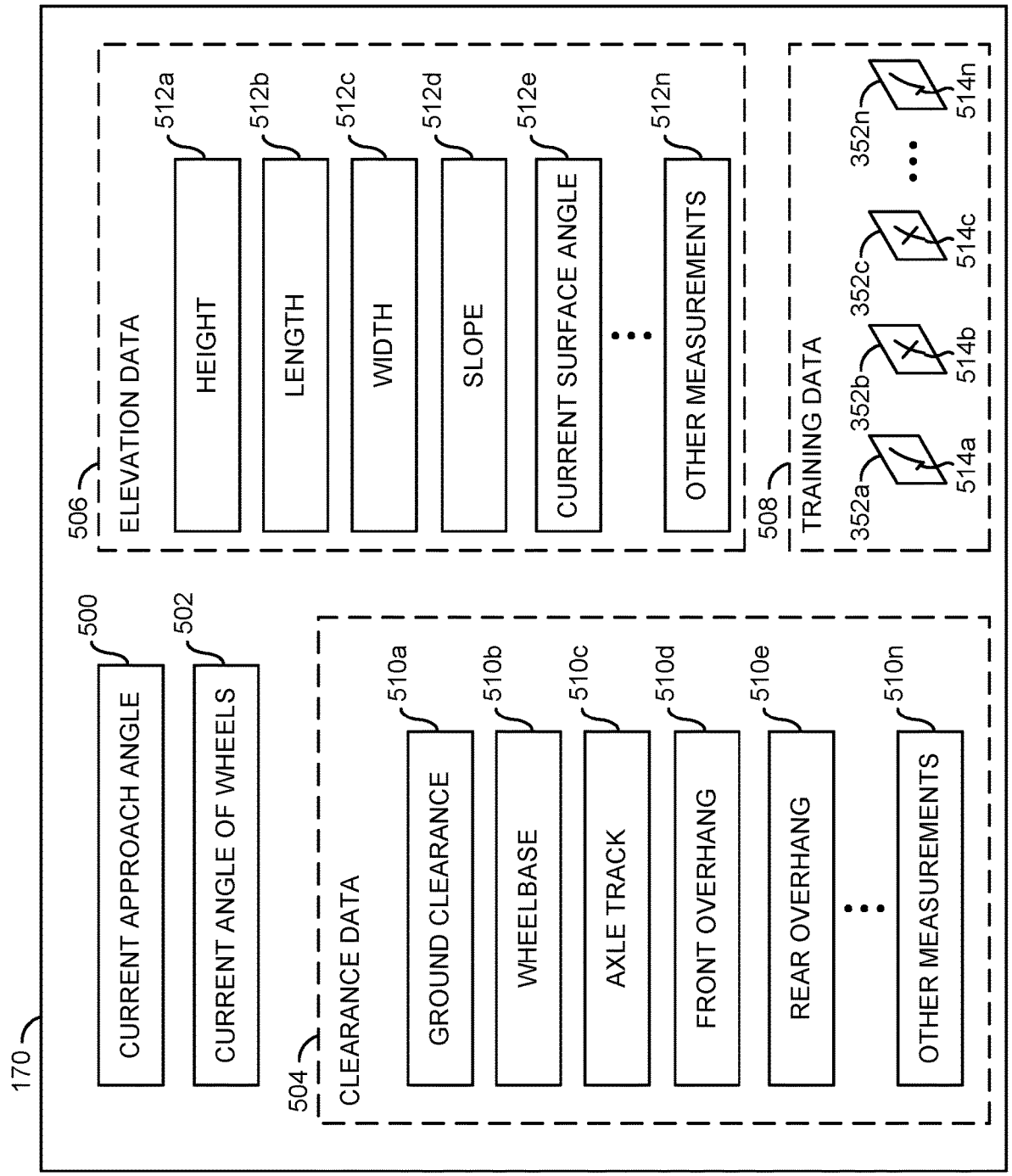
FIG. 10 is a block diagram illustrating clearance data and elevation information stored in a memory.

Referring to FIG. 10, a block diagram illustrating clearance data and elevation information stored in a memory is shown. The lookup table 170 of the memory 108 is shown. For illustrative purposes, the example shown may comprise a portion of data stored in the lookup table 170 (e.g., generally data relevant to determining the approach angle 420a-420b is shown).

The lookup table 170 may comprise a block (or circuit) 500, a block (or circuit) 502, a block (or circuit) 504, a block (or circuit) 506 and/or a block (or circuit) 508. The circuit 500 may comprise data corresponding to a current approach angle of the ego vehicle 50. The circuit 502 may comprise data corresponding to a current angle of the wheels of the ego vehicle 50. The circuit 504 may comprise the clearance data. The circuit 506 may comprise the elevation data (or characteristics). The circuit 508 may comprise training data. The circuits 500-508 may comprise conceptual blocks. For example, the arrangement of stored data in the memory 108 may be stored across various memory modules. The lookup table 170 may store data in volatile and/or non-volatile memory. The lookup table 170 may store other types of data (not shown). The number, type and/or arrangement of the data stored by the lookup table 170 may be varied according to the design criteria of a particular implementation.

The current approach angle 500 may comprise an angle of approach of the ego vehicle 50 for a particular elevated surface 232. In one example, the computer vision operations performed by the processors 106a-106n may be configured to determine the current approach angle 500. For example, the processors 106a-106n may determine where the ego vehicle 50 is located with respect to the elevated surface 232 by analyzing the pixel data FRAMES_A-FRAMES_N to detect the transition 280. In another example, the sensors 114 may be configured to determine the location of the transition 280 with respect to the ego vehicle 50. The current approach angle 500 may be used to determine a correction to the ego vehicle 50 that may be applied to achieve the determined approach angle 420a-420b. For an example of the ego vehicle 50 implementing an autonomous driving vehicle system, a comparison of the current approach angle 500 to the determined approach angle 420a-420b may be used to alter the course of the ego vehicle 50.

The current angle of the wheels 502 may comprise an orientation of the wheels of the ego vehicle 50 with respect to the elevated surface 232. In one example, the processors 106a-106n may read the current angle of the wheels 502 from the sensors 114 of the ego vehicle 50. The current angle of the wheels 502 may be used by the processors 106a-106n to determine how to achieve the approach angle 420a-420b. In one example implementing the autonomous driving vehicle system, the current angle of the wheels 502 may determine how much to adjust the steering direction of the ego vehicle 50 to achieve the approach angle 420a-420b. In another example implementing the display vehicle system, the current angle of the wheels 502 may be used to draw the graphical overlay of the approach angle guide 420a'-420b' on the display 118e.

The clearance data 504 may comprise blocks (or circuits) 510a-510n. The blocks 510a-510n may comprise various types of data that may be relevant to avoiding an impact with the elevated surface 232. The block 510a may comprise a ground clearance. The block 510b may comprise a wheelbase. The block 510c may comprise an axle track. The block 510d may comprise a front overhang. The block 510e may comprise a rear overhang. The block 510n may comprise other measurements. The types of data that may be considered to determine whether the ego vehicle 50 may contact the elevated surface 232 may be varied according to the design criteria of a particular implementation.

The ground clearance 510a may comprise the distance CD shown in association with FIG. 3 (e.g., a distance between the bottom of the ego vehicle 50 and the ground 52). The wheelbase 510b may comprise a measurement of the distance between the front axle and rear axle of the ego vehicle 50 (e.g., a distance between the front wheels and the back wheels). The axle track 510c may comprise a distance between the right wheels and the left wheels (e.g., a width of the axles of the ego vehicle 50). The front overhang 510d may comprise a distance from the front wheels of the ego vehicle 50 to the front end (e.g., the front bumper) of the ego vehicle 50. The rear overhang 510e may comprise a distance from the rear wheels of the ego vehicle 50 to the rear end (e.g., the rear bumper) of the ego vehicle 50.

Generally, the clearance data 504 may be pre-programmed (or previously stored) in the memory 108. For example, when the camera system 100 is installed in the ego vehicle 50, the particular measurements for the clearance data 504 may be stored. The clearance data 504 generally does not change over time. In some embodiments, the clearance data 504 may be acquired using wireless communication. For example, the communication devices 110 may be configured to communicate with a central database service that stores clearance data about various vehicles (e.g., measurements for each make, model and year of vehicle). In one example, the driver 202 may submit the vehicle type and the central database may provide the clearance data measurements. In another example, the driver 202 may submit a VIN number and the central database service may retrieve the corresponding measurements for the clearance data. The method of acquiring the clearance data 504 may be varied according to the design criteria of a particular implementation.

In some embodiments, the clearance data 504 may comprise dynamic measurements. For example, the other measurements 510n may comprise a weight of the ego vehicle

50. The weight of the ego vehicle 50 may change in response to the number of occupants, the weight of the occupants and/or other contents in the ego vehicle 50 (e.g., items purchased, objects towed, luggage, etc.). In another example, the other measurements 510n may comprise a horsepower of the ego vehicle 50. The processors 106a-106n may determine whether the ego vehicle 50 has sufficient power to traverse the elevated surface 232 based on the weight of the ego vehicle 50. For example, the clearance data 504 may be used to determine whether the ego vehicle 50 may traverse the elevated surface 232 without losing traction.

The elevation data 506 may comprise blocks (or circuits) 512a-512n. The blocks 512a-512n may comprise various types of data that may be relevant to determining the characteristics of the elevated surface 232. The block 512a may comprise a height of the elevated surface 232. The block 512b may comprise a length of the elevated surface 232. The block 512c may comprise a width of the elevated surface 232. The block 512d may comprise a slope of the elevated surface 232. The block 512e may comprise a current angle of the surface the ego vehicle 50 is driving on (e.g., the angle of the road 52). The block 512n may comprise other measurements. For example, the other measurements 512n may comprise a distance of the ego vehicle 50 to the elevated surface 232. The types of data that may be considered to determine the elevation of the elevated surface 232 may be varied according to the design criteria of a particular implementation.

The elevation characteristics 512a-512n may be determined for each elevated surface 232 encountered. In some embodiments, the elevation characteristics 512a-512n may be stored permanently for particular elevated surfaces (e.g., along with a GPS/GNSS location). For example, an elevated surface 232 that is often traveled on (e.g., the driveway of a home of the driver 202, a driveway for a parking lot at work, etc.) may be stored so that particular calculations and/or operations are not repeated.

In some embodiments, the other elevation characteristics 512n may comprise weather and/or road conditions. In one example, the ego vehicle 50 may be capable of traversing the elevated surface 232 without losing traction in dry conditions. In another example, the ego vehicle 50 may not be capable of traversing the same elevated surface 232 in rainy, muddy and/or snowy conditions.

The training data 508 may comprise labeled training data. Training data video frames 352a-352n are shown. For example, the training data video frames 352a-352n may comprise video data that shows one or more elevated surfaces (e.g., different elevated surfaces, the same elevated surface 232 as viewed from a different perspective, a view of the same elevated surface 232 at different distances, etc.).

Each of the training data video frames 352a-352n may comprise a respective label 514a-514n. The labels 514a-514n may be provided in the metadata of the video frames 352a-352n. The labels 514a-514n may each provide an indication of whether the approach angle 420a-420n determined by the processors 106a-106n prevented the impact (or loss of traction) between the driving surface of the elevated surface 232 and the ego vehicle 50. In the example shown, the label 514a is shown as a checkmark indicating that there was no impact, the label 514b-514c is shown as an X indicating that there was an impact and the label 514n is shown as a checkmark indicating that there was no impact. The type of data provided as the label 514a-514n that indicates whether or not there has been an impact may be varied according to the design criteria of a particular implementation.

The labels 514a-514n may enable the training data 352a-352n to train the artificial intelligence model 490 and/or the artificial intelligence model 492. In one example, the labels 514a-514n may be generated in response to an input provided by an accelerometer (e.g., one of the sensors 114) of the ego vehicle 50. For example, the video frames may comprise a timestamp and the reading from the accelerometer may indicate whether there has been an impact detected at the time that the ego vehicle 50 was traversing the elevated surface 232. The video frames with the timestamp that corresponds to the time of the impact (or an earlier time before the impact when the elevated surface 232 was still visible) may be labeled and used as the training data 352a-352n. In another example, a user, such as the driver 202, may provide an input (e.g., using the interface 104 such as a touchscreen interface and/or communicating via the communication device 110 by connecting a smartphone that provides an app for providing feedback) and the input may indicate whether or not there was an impact. The input from the user may be used to provide the labels 514a-514n for the training data 352a-352n. The method of providing the labels 514a-514n for the training data 352a-352n may be varied according to the design criteria of a particular implementation.

Figure 11:
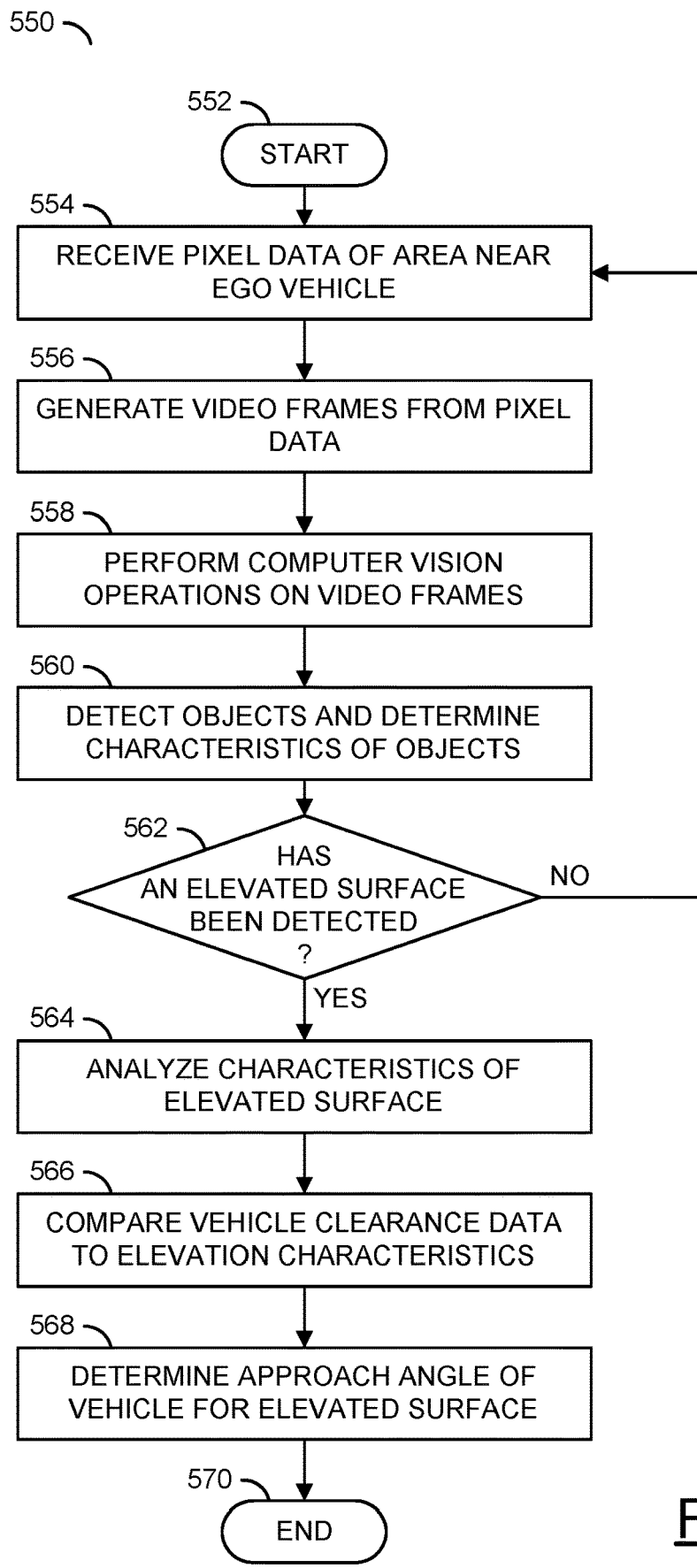
FIG. 11 is a flow diagram illustrating a method for using vehicle cameras for automatically determining approach angles for driveways.

Referring to FIG. 11, a method (or process) 550 is shown. The method 550 may use vehicle cameras to automatically determine approach angles for driveways. The method 550 generally comprises a step (or state) 552, a step (or state) 554, a step (or state) 556, a step (or state) 558, a step (or state) 560, a decision step (or state) 562, a step (or state) 564, a step (or state) 566, a step (or state) 568, and a step (or state) 570.

The step 552 may start the method 550. In the step 554, the processors 106a-106n may receive pixel data. One or more of the capture devices 102a-102n may present the signals FRAMES_A-FRAMES_N to the processors 106a-106n. Next, in the step 556, the processors 106a-106n may generate video frames from the pixel data. For example, one or more of the dedicated hardware modules 180a-180n and/or the video processing pipeline 156 may generate video frames from the signals FRAMES_A-FRAMES_N. Next, the method 550 may move to the step 558.

In the step 558, the processors 106a-106n may perform computer vision operations on the video frames. In an example, the video processing pipeline 156 may present the video frames to the CNN module 150 as the video frames are generated to enable real-time computer vision operations. Next, in the step 560, the CNN module 150 may perform object detection and/or determine the characteristics of the objects detected. The object detection, along with classification and/or segmentation may be part of the computer vision operations performed by the CNN module 150. Next, the method 550 may move to the decision step 562.

In the decision step 562, the processors 106a-106n may determine whether the elevated surface 232 has been detected. In one example, the elevation characteristics neural network 482 may determine the presence of the elevated surface 232. In another example, the end-to-end neural network 482' may determine the presence of the elevated surface 232. If the elevated surface 232 has not been detected, then the method 550 may return to the step 554. If the elevated surface 232 has been detected, then the method 550 may move to the step 564.

In the step 564, the CNN module 150 may analyze the elevation characteristics 506 of the elevated surface. In one example, the elevation characteristics neural network 482 may analyze the video frames to determine the elevation characteristics 506. In another example, the end-to-end neural network 482' may analyze the video frames to determine the elevation characteristics 506. Next, in the step 566, the sensor fusion module 152 may perform a comparison of the clearance data 504 of the ego vehicle 50 to the elevation data 506 detected. In the step 568, the decision module 158 may determine the approach angle 420a-420b for the ego vehicle 50 for the elevated surface 232. The approach angle 420a-420b may be presented to a desired vehicle system (e.g., an autonomous driving system, to the displays 118a-118n, to an audio alert system, etc.). Next, the method 550 may move to the step 570. The step 570 may end the method 550.

Figure 12:
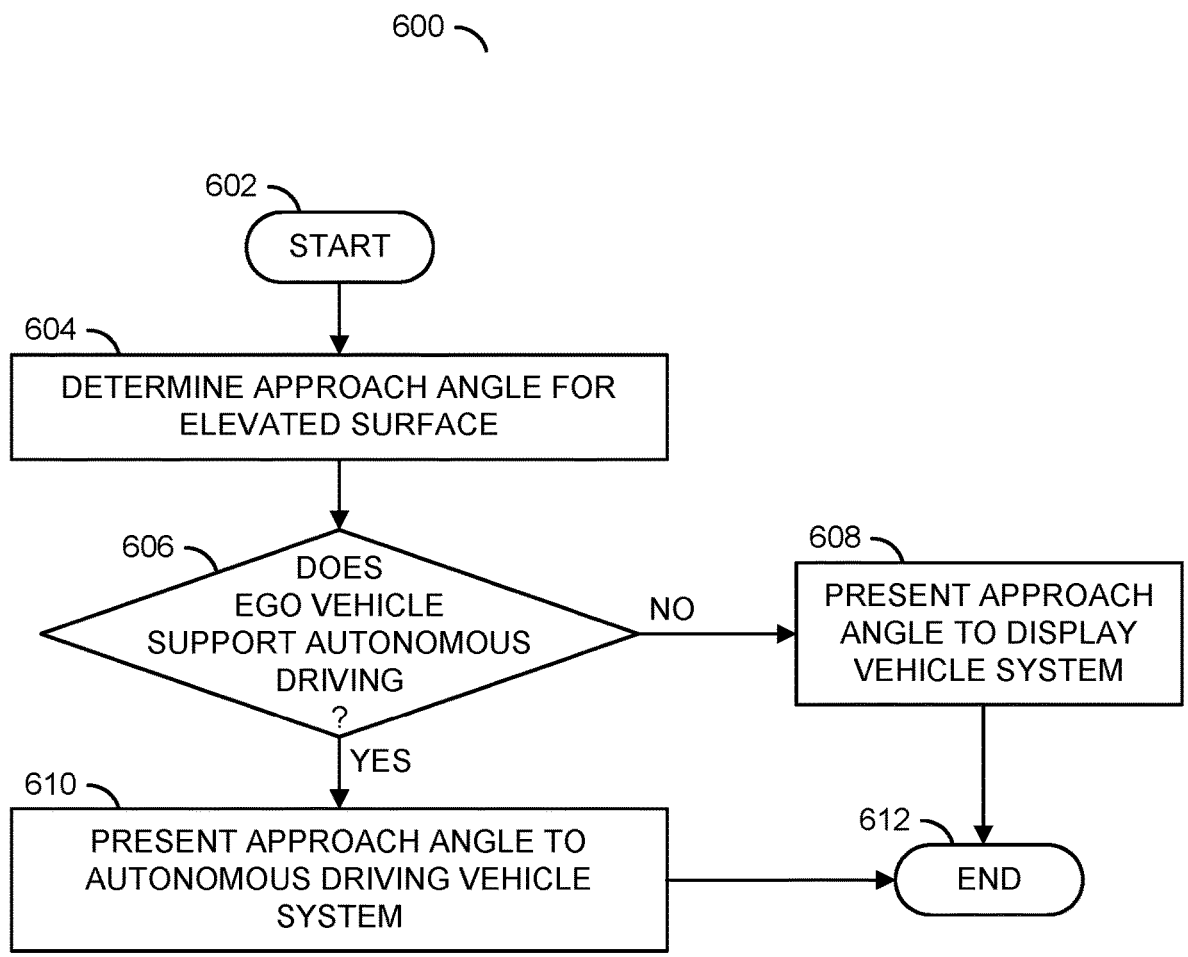
FIG. 12 is a flow diagram illustrating a method for providing an approach angle to an autonomous driving vehicle system.

Referring to FIG. 12, a method (or process) 600 is shown. The method 600 may provide an approach angle to an autonomous driving vehicle system. The method 600 generally comprises a step (or state) 602, a step (or state) 604, a decision step (or state) 606, a step (or state) 608, a step (or state) 610, and a step (or state) 612.

The step 602 may start the method 600. In the step 604, the processors 106a-106n may determine the approach angle 420a-420b for the elevated surface 232. Next, the method 600 may move to the decision step 606.

In the decision step 606, the processors 106a-106n may determine whether the ego vehicle 50 supports autonomous driving. In an example, the processors 106a-106n may communicate using the interface 104 to determine the capabilities of the ego vehicle 50 and/or the presence of various components of vehicle systems. If the ego vehicle 50 does not support autonomous driving, then the method 600 may move to the step 608. In the step 608, the processors 106a-106n may present the approach angle 420a-420b to a display system of the ego vehicle 50 (e.g., the displays 118a-118n). Next, the method 600 may move to the step 612.

In the decision step 606, if the ego vehicle 50 does support autonomous driving, the method 600 may move to the step 610. In the step 610, the processors 106a-106n may present the approach angle 420a-420b to the autonomous driving system. In one example, the autonomous driving system may be the actuators 116 and the approach angle 420a-420b may be presented as the signal VCTRL. Next, the method 600 may move to the step 612. The step 612 may end the method 600.

Figure 13:
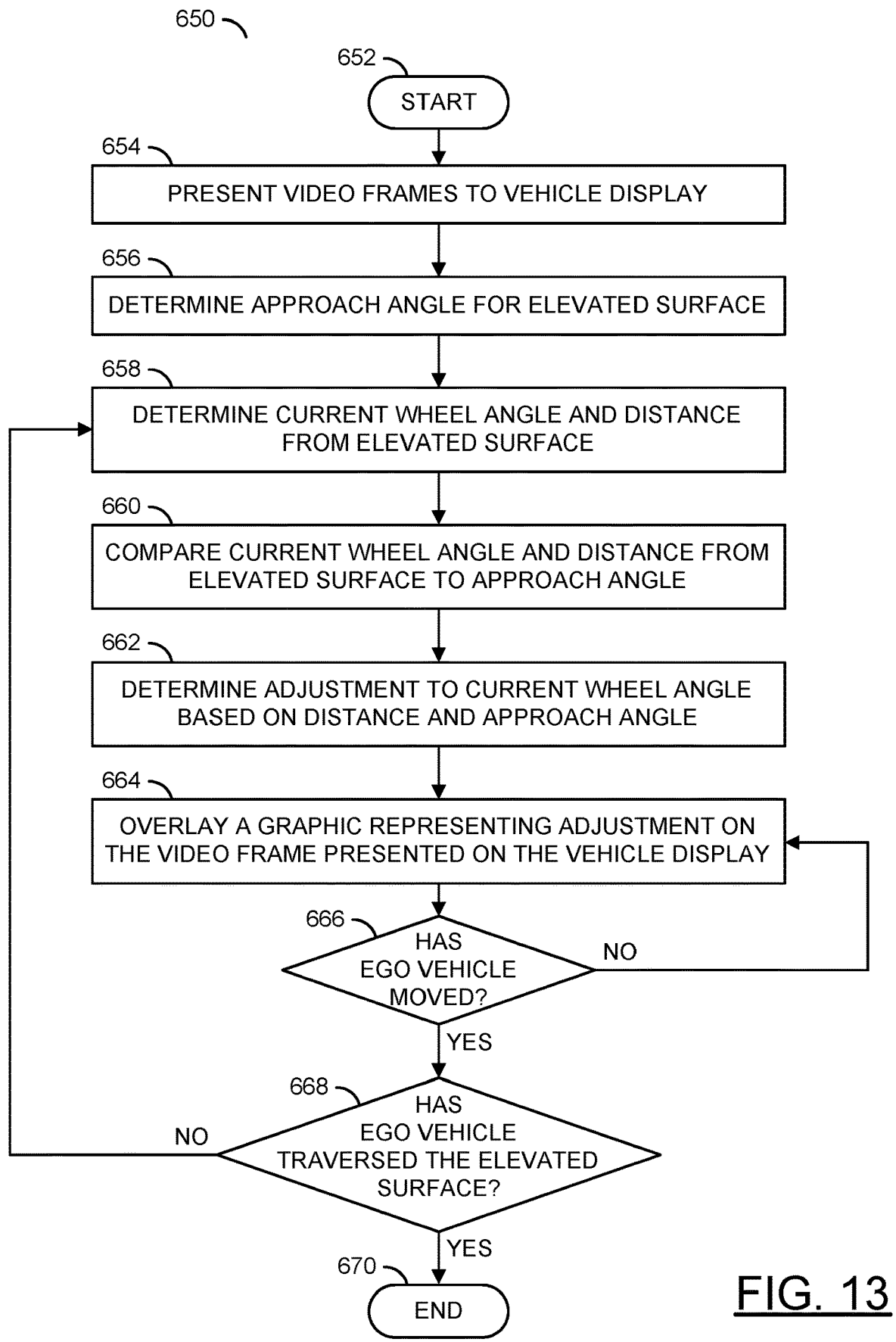
FIG. 13 is a flow diagram illustrating a method for providing an approach angle to a vehicle display system with real-time wheel angle updates.

Referring to FIG. 13, a method (or process) 650 is shown. The method 650 may provide an approach angle to a vehicle display system with real-time wheel angle updates. The method 650 generally comprises a step (or state) 652, a step (or state) 654, a step (or state) 656, a step (or state) 658, a step (or state) 660, a step (or state) 662, a step (or state) 664, a decision step (or state) 666, a decision step (or state) 668, and a step (or state) 670.

The step 652 may start the method 650. In the step 654, the processors 106a-106n may present the video frames to the vehicle displays 118a-118n. For example, the output video frames may be presented by the processors 106a-106n as the signals VOUT_A-VOUT_N. Next, in the step 656, the processors 106a-106n may determine the approach angle 420a-420b for the elevated surface 232 detected. Next, the method 650 may move to the step 658.

In the step 658, the processors 106a-106n may determine the current wheel angle 502 and/or a distance of the ego vehicle 50 from the elevated surface 232. For example, the computer vision operations may analyze the number of pixels to the elevated surface using a front mounted camera (e.g., if the ego vehicle 50 is traveling forward) or a rear camera (e.g., if the ego vehicle 50 is traveling in reverse) to determine the distance to the elevated surface 232. In another example, the sensors 114 may provide the current wheel angle 502 of the ego vehicle 50. Next, in the step 660, the sensor fusion module 152 may compare the current wheel angle 502, the distance from the elevated surface 232 and/or the current approach angle 500 with the determined approach angle 420a-420b. Next, the method 650 may move to the step 662.

In the step 662, the processors 106a-106n may determine an adjustment to the current wheel angle 502 based on the distance from the elevated surface 232 and the approach angle 420a-420b. Next, in the step 664, the processors 106a-106n may present data to the displays 118a-118n to overlay the graphics 420a'-420b' representing an adjustment on the output video frame 460 presented on the displays 118a-118n. The adjustment may indicate how much the driver 202 should move the steering wheel 458 to bring the ego vehicle 50 into alignment with the determined approach angle 420a-420b. Next, the method 650 may move to the decision step 666.

In the decision step 666, the processors 106a-106n may determine whether the ego vehicle 50 has moved. The ego vehicle 50 may be determined to have moved based on changes in the video frames (e.g., the objects in the video frame change position, the elevated surface 232 has moved closer or farther away, etc.) and/or from reading the vehicle sensors 114 (e.g., reading GPS/GNSS data, reading an accelerometer, etc.). If the ego vehicle 50 has not moved, then the method 650 may return to the step 664. If the ego vehicle 50 has moved, then the method 650 may move to the decision step 668.

In the decision step 668, the processors 106a-106n may determine whether the ego vehicle 50 has traversed the elevated surface 232. In an example, the video frames may be analyzed to determine whether the elevated surface is detected behind (if traveling forward) or in front of (if traveling in reverse) the ego vehicle 50. In another example, a gyroscope may determine an orientation of the ego vehicle 50 (e.g., on an incline/decline). If the ego vehicle 50 has not traversed the elevated surface 232, then the method 650 may return to the step 658. If the ego vehicle 50 has traversed the elevated surface 232, then the method 650 may move to the step 670. The step 670 may end the method 650.

Figure 14:
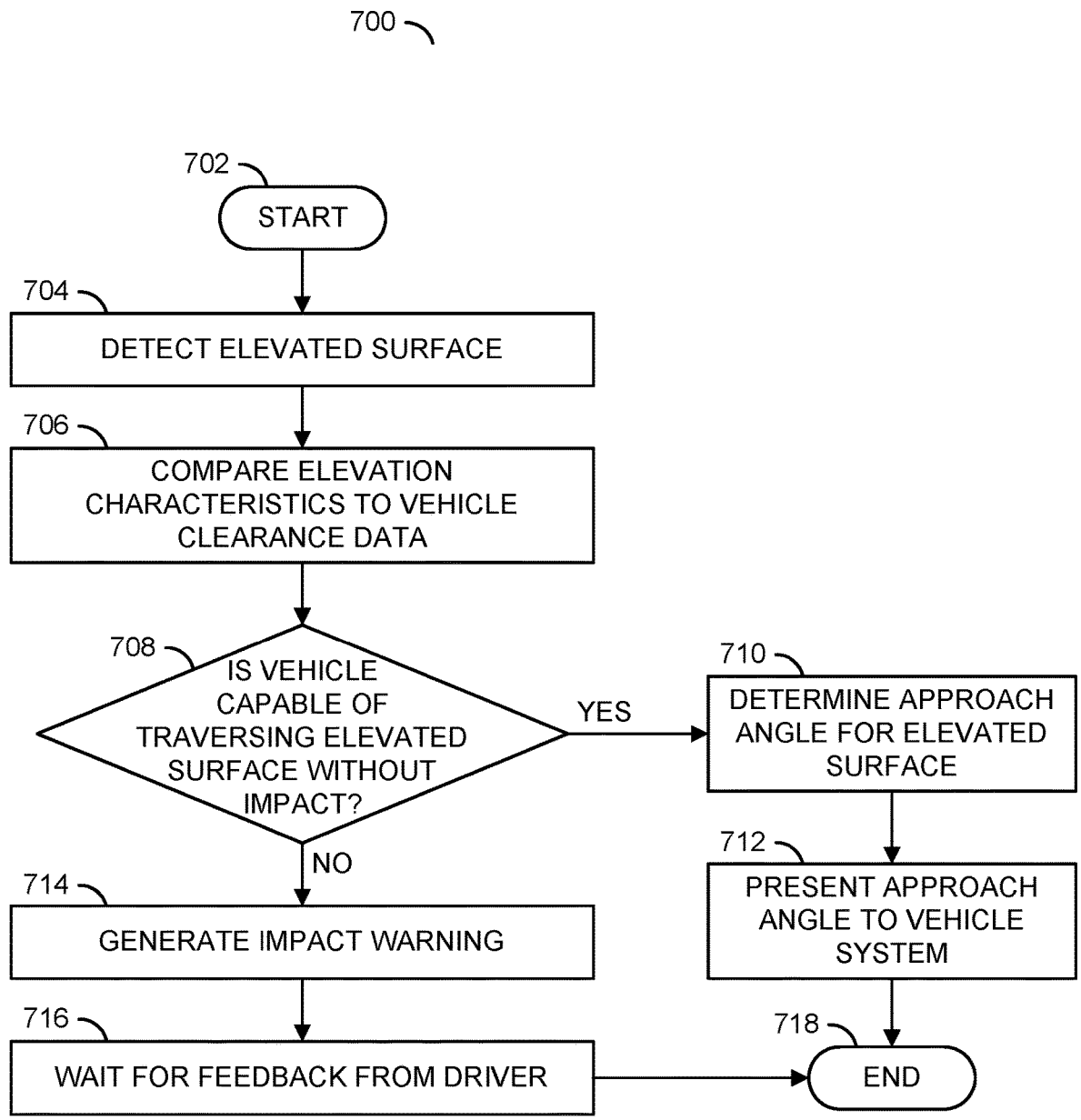
FIG. 14 is a flow diagram illustrating a method for generating a warning when an impact with an elevated surface is unavoidable.

Referring to FIG. 14, a method (or process) 700 is shown. The method 700 may generate a warning when an impact with an elevated surface is unavoidable. The method 700 generally comprises a step (or state) 702, a step (or state) 704, a step (or state) 706, a decision step (or state) 708, a step (or state) 710, a step (or state) 712, a step (or state) 714, a step (or state) 716, and a step (or state) 718.

The step 702 may start the method 700. In the step 704, the processors 106a-106n may detect the elevated surface 232. Next, in the step 706, the processors 106a-106n may compare the elevation characteristics 506 to the clearance data 504 of the ego vehicle 50. Next, the method 700 may move to the decision step 708.

In the decision step 708, the decision module 158 may determine whether the ego vehicle 50 is capable of traversing the elevated surface 232 without an impact (or without losing traction). If the ego vehicle 50 is capable of traversing the elevated surface 232, then the method 700 may move to the step 710.

In the step 710, the processors 106a-106n may determine the approach angle 420a-420b. Next, in the step 712, the processors 106a-106n may present the approach angle 420a-420b to the vehicle system (e.g., an autonomous driving system, a display system, a driver assistance system, etc.). Next, the method 700 may move to the step 718.

In the decision step 708, if the ego vehicle 50 is not capable of traversing the elevated surface 232 without an impact (or without losing traction), then the method 700 may move to the step 714. In the step 714, the processors 106a-106n may generate the warning. In one example, the warning may be an audio warning (e.g., a dinging alert, a voice message, etc.). In another example, the warning may be the graphical warning 464 shown on one or more of the displays 118a-118n. Next, in the step 716, the processors 106a-106n may wait for feedback from the driver 202 and/or another vehicle occupant. For example, the autonomous driving system may not attempt to traverse the elevated surface 232 without permission from the driver 202. Next, the method 700 may move to the step 718. The step 718 may end the method 700.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface to receive pixel data of an area external to a vehicle; and
    a processor to (i) generate video frames from said pixel data, (ii) perform computer vision operations on said video frames to (a) detect objects in said video frames and (b) determine characteristics of said objects, (iii) analyze said characteristics of said objects to determine elevation characteristics of a driving surface with respect to said vehicle, (iv) perform a comparison of said elevation characteristics to clearance data of said vehicle and (v) determine an approach angle for said vehicle in response to said comparison, wherein
       (a) said approach angle is determined to prevent an impact between said vehicle and said driving surface,
       (b) said approach angle is presented to a vehicle system, and
       (c) said processor comprises hardware modules to implement a neural network to determine said approach angle in response to said video frames and said clearance data.

2. The apparatus according to claim 1, wherein said vehicle system comprises an autonomous vehicle control system to automatically drive said vehicle on said driving surface using said approach angle.

3. The apparatus according to claim 1, wherein (i) said vehicle system comprises a display device and (ii) said processor (a) outputs said video frames to said display device and (b) displays said approach angle as an overlay on said video frames.

4. The apparatus according to claim 3, wherein said overlay comprises lines indicating where wheels of said vehicle should be directed to in order to move said vehicle at said approach angle.

5. The apparatus according to claim 4, wherein said processor (i) receives wheel direction data from sensors of said vehicle, (ii) compares said wheel direction data to said approach angle and (iii) updates said overlay in real time to indicate to a driver how to achieve said approach angle.

6. The apparatus according to claim 1, wherein said driving surface is a driveway.

7. The apparatus according to claim 1, wherein said elevation characteristics comprise a slope of said driving surface, a width of said driving surface and a height of said driving surface.

8. The apparatus according to claim 1, wherein (i) said pixel data is generated by a capture device mounted to a front of said vehicle and (ii) said approach angle comprises an angle for driving said vehicle in a forward direction on said driving surface.

9. The apparatus according to claim 1, wherein (i) said pixel data is generated by a capture device mounted to a rear end of said vehicle and (ii) said approach angle comprises an angle for backing up said vehicle on said driving surface.

10. The apparatus according to claim 1, wherein training data for an artificial intelligence model implemented by said neural network comprises said video frames with label metadata that provides an indication of whether said approach angle prevented said impact between said driving surface and said vehicle.

11. The apparatus according to claim 10, wherein (i) said processor receives information from an accelerometer sensor of said vehicle and (ii) said processor generates said label metadata based on said information from said accelerometer sensor.

12. The apparatus according to claim 10, wherein (i) said processor receives an input from a user and (ii) said processor generates said label metadata based on said input from said user.

13. The apparatus according to claim 10, wherein (i) said artificial intelligence model implemented by said neural network is enhanced using said training data received from a fleet of vehicles and (ii) each vehicle in said fleet of vehicles comprises an implementation of said apparatus.

14. The apparatus according to claim 10, wherein said artificial intelligence model implemented by said neural network is updated in response to receiving data from a wireless communication.

15. The apparatus according to claim 1, wherein said driving surface has an incline with respect to said vehicle.

16. The apparatus according to claim 1, wherein said driving surface comprises a transition from a decline to a relatively flat surface with respect to said vehicle.

17. The apparatus according to claim 1, wherein said processor (i) determines that said impact with said driving surface is unavoidable regardless of said approach angle based on said comparison of said elevation characteristics to said clearance data and (ii) generates a warning when said impact with said driving surface is unavoidable.

18. A method for determining an approach angle for an elevated surface, comprising the steps of:
(A) receiving pixel data of an area external to a vehicle at an interface;
(B) generating video frames from said pixel data using a processor;
(C) perform computer vision operations on said video frames to (a) detect objects in said video frames and (b) determine characteristics of said objects;
(D) analyzing said characteristics of said objects to determine elevation characteristics of a driving surface with respect to said vehicle;
(E) performing a comparison of said elevation characteristics to clearance data of said vehicle; and
(F) determining said approach angle for said vehicle in response to said comparison, wherein
(a) said approach angle is determined to prevent an impact between said vehicle and said driving surface,
(b) said approach angle is presented to a vehicle system, and
(c) said processor comprises hardware modules to implement a neural network to determine said approach angle in response to said video frames and said clearance data.

19. An apparatus comprising:
an interface to receive pixel data of an area external to a vehicle; and
a processor to (i) generate video frames from said pixel data, (ii) perform computer vision operations on said video frames to (a) detect objects in said video frames and (b) determine characteristics of said objects, (iii) analyze said characteristics of said objects to determine elevation characteristics of a driving surface with respect to said vehicle, (iv) perform a comparison of said elevation characteristics to clearance data of said vehicle and (v) determine an approach angle for said vehicle in response to said comparison, wherein
(a) said approach angle is determined to prevent an impact between said vehicle and said driving surface,
(b) said approach angle is presented to a vehicle system, and
(c) said vehicle system comprises a display device and (ii) said processor further (a) outputs said video frames to said display device and (b) displays said approach angle as an overlay on said video frames.

20. The apparatus according to claim 19, wherein said processor comprises hardware modules to implement (i) a first neural network to determine said elevation characteristics of said driving surface in response to said video frames and (ii) a second neural network to determine said approach angle in response to said elevation characteristics and said clearance data.

21. The apparatus according to claim 19, wherein said vehicle system comprises an autonomous vehicle control system to automatically drive said vehicle on said driving surface using said approach angle.

22. The apparatus according to claim 19, wherein (i) said pixel data is generated by a capture device mounted to a front of said vehicle and (ii) said approach angle comprises an angle for driving said vehicle in a forward direction on said driving surface.

23. The apparatus according to claim 19, wherein (i) said pixel data is generated by a capture device mounted to a rear end of said vehicle and (ii) said approach angle comprises an angle for backing up said vehicle on said driving surface.

24. The apparatus according to claim 19, wherein said processor further (i) determines that said impact with said driving surface is unavoidable regardless of said approach angle based on said comparison of said elevation characteristics to said clearance data and (ii) generates a warning when said impact with said driving surface is unavoidable.

* * * * *